(12) United States Patent
Kihara et al.

(10) Patent No.: US 8,903,878 B2
(45) Date of Patent: Dec. 2, 2014

(54) INFORMATION PROCESSING PROGRAM, INFORMATION PROCESSING DEVICE AND INFORMATION PROCESSING METHOD

(75) Inventors: Masahiro Kihara, Fukuoka (JP); Tomonori Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/421,352

(22) Filed: Mar. 15, 2012

(65) Prior Publication Data

US 2012/0290598 A1 Nov. 15, 2012

(30) Foreign Application Priority Data

Mar. 17, 2011 (JP) .................................. 2011-059133

(51) Int. Cl.
| | |
|---|---|
| *G06F 7/00* | (2006.01) |
| *G06F 17/00* | (2006.01) |
| *G06F 17/30* | (2006.01) |
| *G06F 3/06* | (2006.01) |

(52) U.S. Cl.
CPC ............ *G06F 3/0611* (2013.01); *G06F 3/0643* (2013.01); *G06F 3/0674* (2013.01)
USPC .......................................... 707/899; 707/758

(58) Field of Classification Search
CPC ........................................................ G06F 7/023
USPC ........... 707/769, 3, 5, 652; 715/500; 370/231, 370/254; 711/154
See application file for complete search history.

(56) References Cited

U.S. PATENT DOCUMENTS

| | | | | |
|---|---|---|---|---|
| 7,742,415 | B1 * | 6/2010 | Dave ............................. | 370/231 |
| 2003/0191754 | A1 * | 10/2003 | Dey et al. .......................... | 707/3 |
| 2005/0022107 | A1 * | 1/2005 | Dey et al. ....................... | 715/500 |
| 2009/0125504 | A1 * | 5/2009 | Adams et al. ...................... | 707/5 |
| 2010/0223276 | A1 * | 9/2010 | Al-Shameri et al. ........... | 707/769 |
| 2012/0137086 | A1 * | 5/2012 | Oe et al. ......................... | 711/154 |
| 2012/0185437 | A1 * | 7/2012 | Pavlov et al. ................. | 707/652 |
| 2012/0250579 | A1 * | 10/2012 | Kalika et al. .................. | 370/254 |

FOREIGN PATENT DOCUMENTS

| | | |
|---|---|---|
| JP | 7-152623 | 6/1995 |
| JP | 8-241230 | 9/1996 |

* cited by examiner

*Primary Examiner* — Susan Chen
(74) *Attorney, Agent, or Firm* — Staas & Halsey LLP

(57) ABSTRACT

A non-transitory medium recording an information processing program causing a computer to execute procedures, the procedures includes receiving, as input, positional information that indicates a position of a part of the data file from the reference position, searching a second management information item corresponding to the input, searching a first management information item corresponding to the input and the searched second management information item, and accessing the part that is among the parts of the data file and stored at a position indicated by the searched first management information item; calculating, based on a frequency of access to the accessed part, a distribution of frequencies of access to the parts associated with the first management information items; and updating, based on the distribution of the frequencies, the positional information indicated by the second management information items and first management information items.

10 Claims, 28 Drawing Sheets

DATA ENTITY

DATA ENTITY

INFORMATION PROCESSING PROGRAM, INFORMATION PROCESSING DEVICE AND INFORMATION PROCESSING METHOD

CROSS-REFERENCE TO RELATED APPLICATION(S)

This application is based upon and claims the benefit of priority of the prior Japanese Patent Application No. 2011-59133, filed on Mar. 17, 2011, the entire contents of which are incorporated herein by reference.

FIELD

The embodiment discussed herein is related to an information processing program, an information processing device and an information processing method.

BACKGROUND

When a large amount of data is used, the amount of data to be moved in order to insert or change data is large. Thus, a processing load of a storage device, a processing load of a data processing device, and a band load applied during transmission of data are large. A technique for dividing and managing data and achieving processing equivalent to a change and insertion of data only by editing management information is known.

In order to divide and manage data, the data is managed so that a user can reference, change, add and delete the data at high speeds. For example, a file access method and a data management method are known (refer to, for example, Japanese Laid-open Patent Publication No. 07-152623 and Japanese Laid-open Patent Publication No. 08-241230).

In the file access method, files are managed using a tree structure. In addition, in the file access method, in order to access the files at a high speed, information that enables a specific file to be directly accessed is generated and arranged in order of priorities.

In addition, in the data management method, data to be continuously accessed and data to be discontinuously accessed are arranged optimally for a file that is formed by combining the data to be continuously accessed with the data to be discontinuously accessed. In the data management method, the efficiency of accessing a data entity is improved by continuously assigning a variable-length block to the data to be continuously accessed.

SUMMARY

According to an aspect of the invention, a non-transitory medium recording an information processing program causing a computer to execute procedures, the procedures includes receiving, as input, positional information that indicates a position of a part of the data file from the reference position, searching a second management information item corresponding to the input, searching a first management information item corresponding to the input and the searched second management information item, and accessing the part that is among the parts of the data file and stored at a position indicated by the searched first management information item; calculating, based on a frequency of access to the accessed part, a distribution of frequencies of access to the parts associated with the first management information items; and updating, based on the distribution of the frequencies, the positional information indicated by the second management information items and first management information items.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described in detail.

Figure 1:
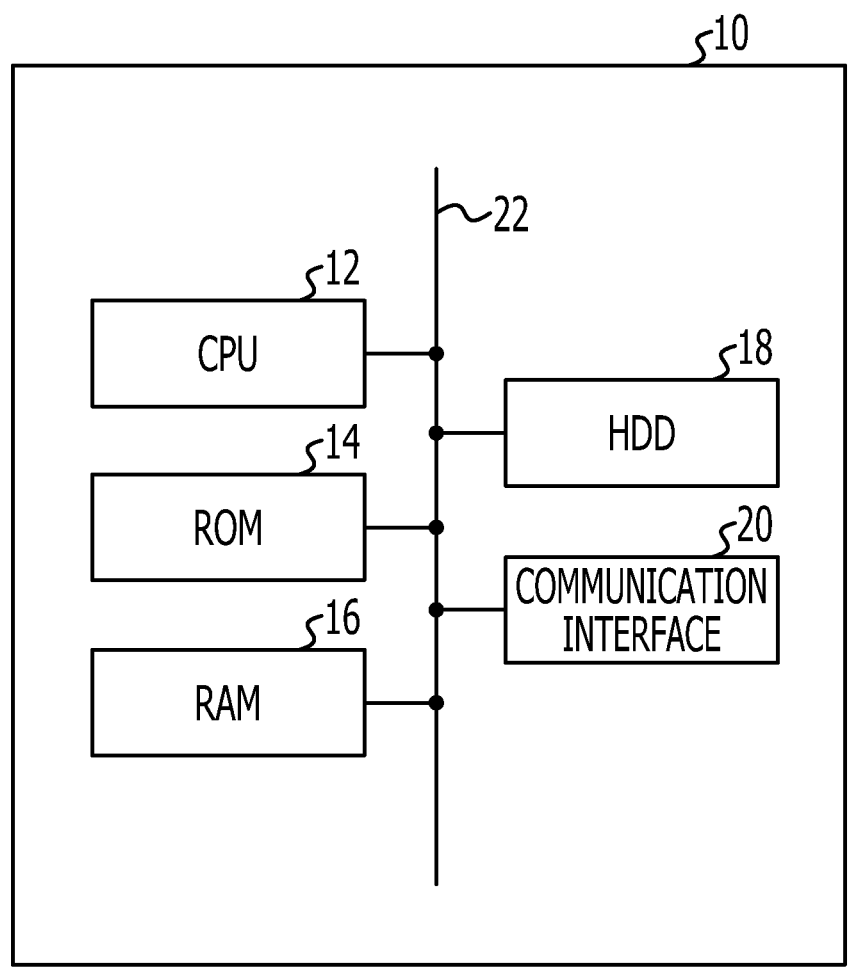
FIG. 1 is a schematic diagram illustrating an information processing device of a first embodiment.

As illustrated in FIG. 1, an information processing device 10 of a first embodiment includes a central processing unit (CPU) 12, a read only memory (ROM) 14, a random access memory (RAM) 16, a hard disk drive (HDD) 18, a communication interface 20 and a bus 22 that connects them each other.

Figure 2A:
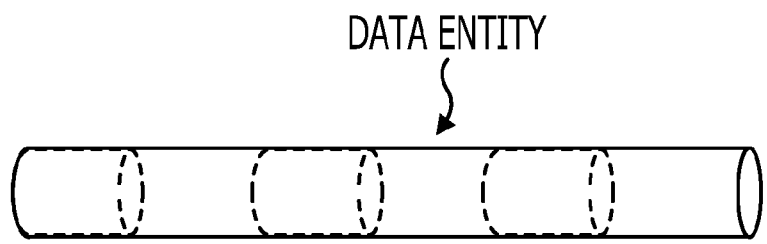
FIG. 2A is a diagram illustrating a data entity that is not divided.
Figure 2B:
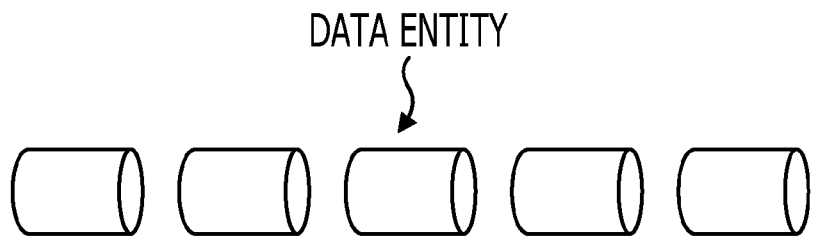
FIG. 2B is a diagram illustrating data entities divided as interval data items.

The CPU 12 executes various programs. The various programs, parameters and the like are stored in the ROM 14. The RAM 16 is used as a work area or the like for the execution of the various programs, while the CPU 12 executes the various programs. Various data and the various programs are stored in the HDD 18 that serves as a storage device. One of the various programs is a program to be executed in order to perform an access processing routine (described later). Another one of the various programs is a program to be executed in order to perform an arrangement update processing routine (described later). The HDD 18 stores a data file. The HDD 18 stores, as the data file, interval data when a data entity is not actually divided as illustrated in FIG. 2A. Alternatively, the HDD 18 stores, as the data file, interval data items when the data entity is divided into data entities as illustrated in FIG. 2B. The HDD 18 may store, as the data file, both interval data items formed when a data entity is divided into data entities and interval data formed when a data entity is not actually divided. The communication interface 20 is coupled to a display (not illustrated) and outputs the data file (to be displayed on the display) to the display.

Figure 3:
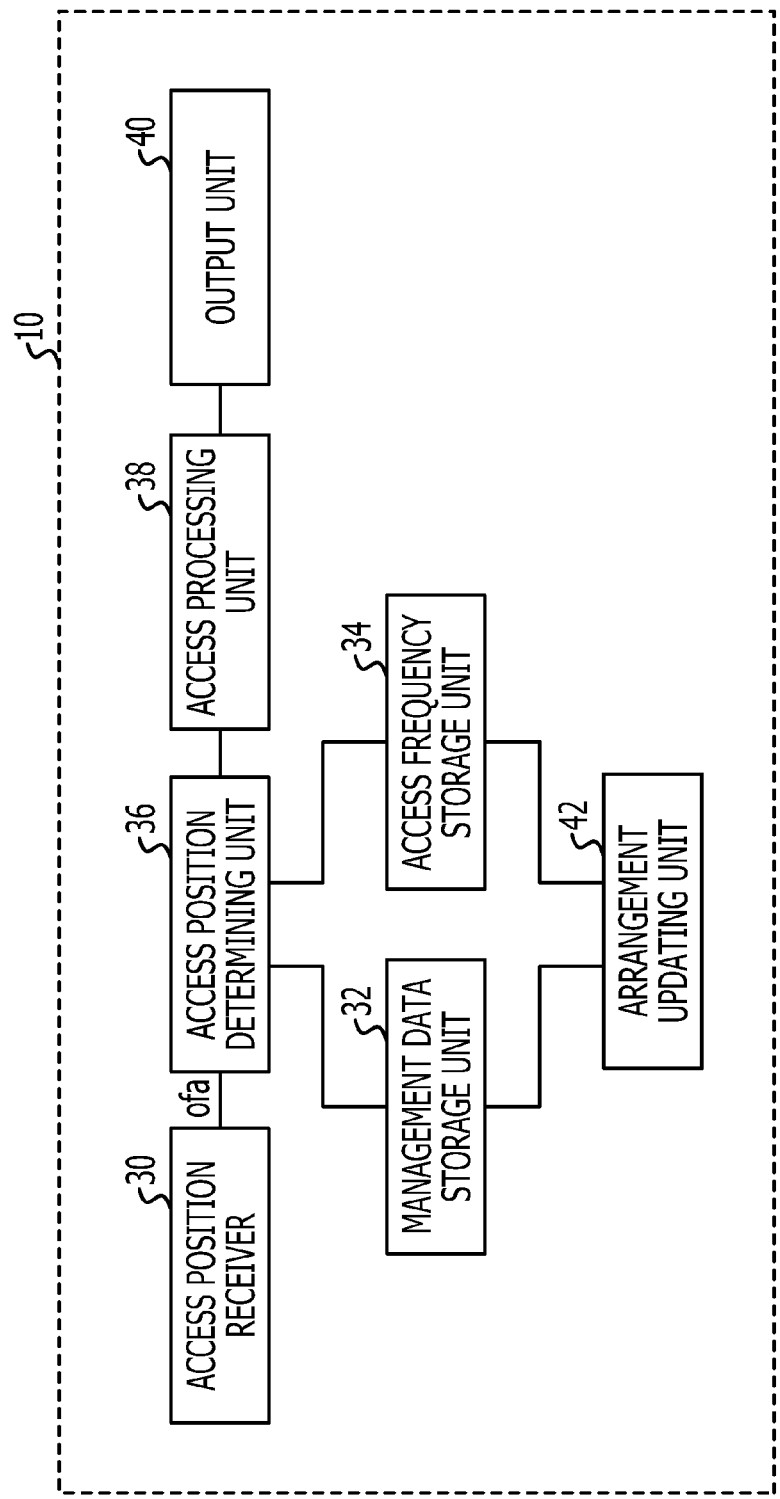
FIG. 3 is a functional block illustrating the information processing device of the first embodiment.

When the information processing device 10 is represented by functional blocks, the information processing device 10 includes an access position receiver 30, a management data storage unit 32, an access frequency storage unit 34, an access position determining unit 36, an access processing unit 38, an output unit 40 and an arrangement updating unit 42, as illustrated in FIG. 3.

Figure 4:
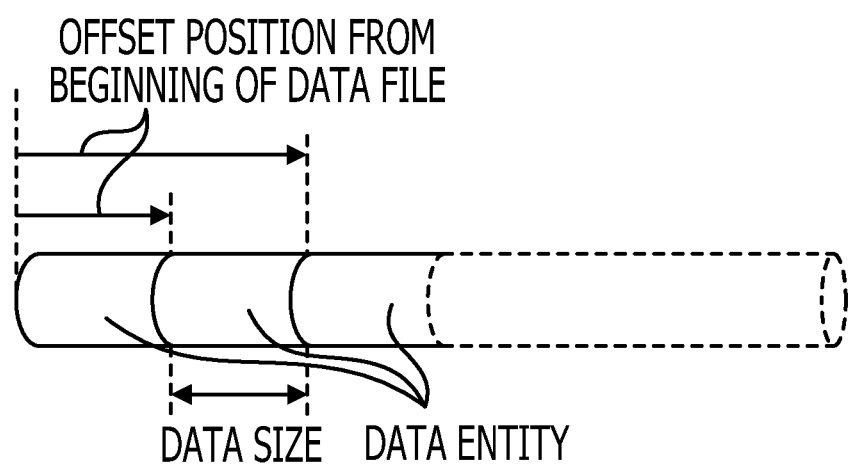
FIG. 4 is a diagram illustrating offset positions of data entities from the beginning of a data file.

The access position receiver 30 receives, as information of the position (to be accessed) of a part of the data file to be accessed, information (refer to FIG. 4) that indicates an offset position of the part of the data file from the beginning of the data file. The information that indicates the offset position from the beginning of the data file is an example of positional information that indicates a position of a part of a data file from a reference position of the data file.

For example, it is assumed that the data file is data formed by continuously arranging temporally continuous coded data units (units (GOP units) of groups of pictures, scene units or the like) such as a coded stream of video image data. The data entities are data of the coded data units and correspond to data of the GOP units or scene units. The offset position may be set on a time basis or on a data amount basis.

Figure 5:
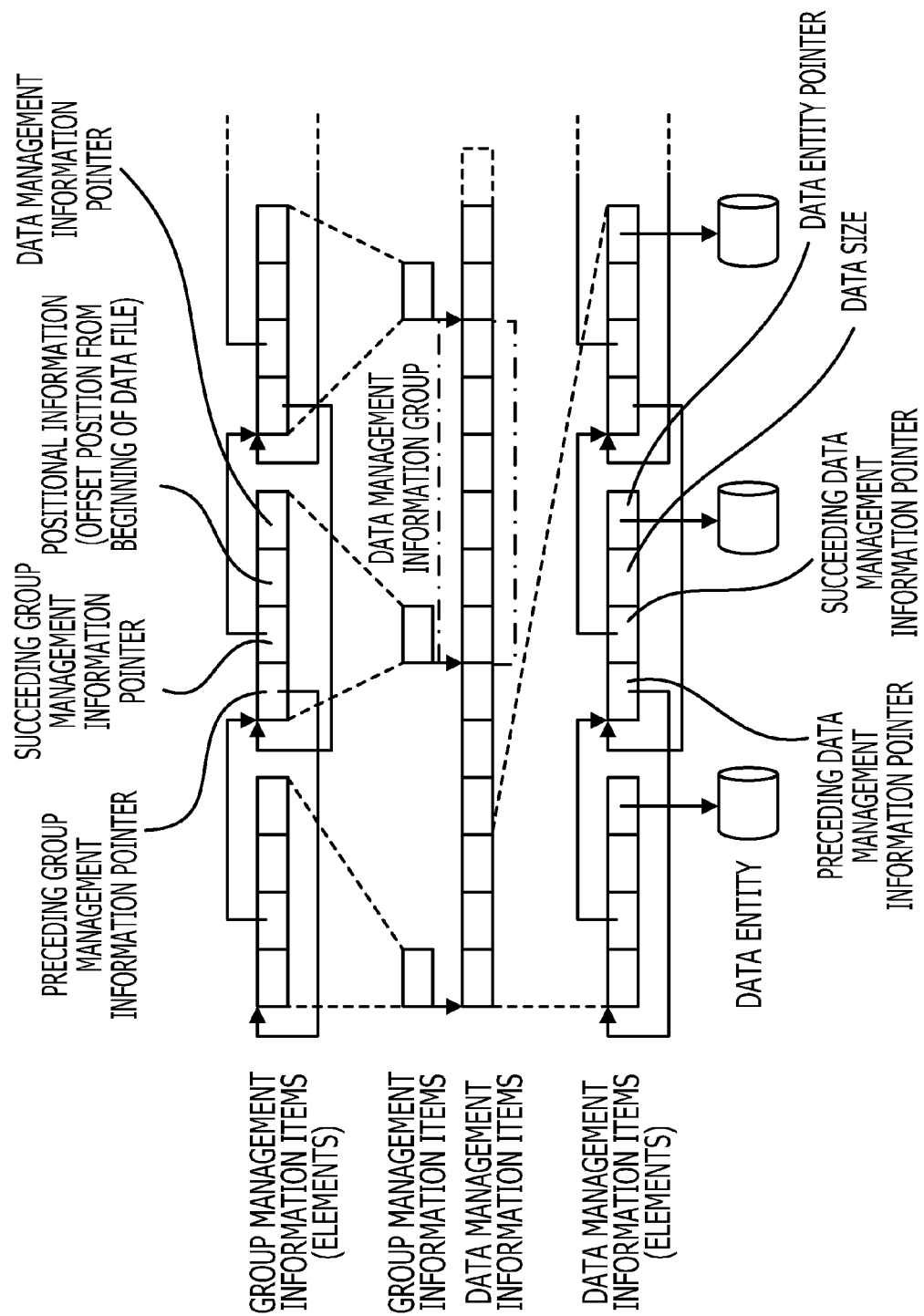
FIG. 5 is a diagram illustrating elements of a data management information item and elements of a group management information item.

The management data storage unit 32 stores a plurality of data management information items. The plurality of data management information items are associated, as illustrated in FIG. 5, with actual interval data items in order of the interval data items and are information items to be used to manage an order relationship among the interval data items and information of the positions of the interval data items. An advantage of use of the data management information items is that a cost for moving data in order to change the order relationship among the interval data items and the information of the positions of the interval data items is low. This is due to the fact that it is sufficient if only the data management information items are changed without control of the interval data items.

Elements of the data management information items include a preceding data management information pointer and a succeeding data management information pointer. The preceding data and the succeeding data indicate a data that immediately precedes or succeeds the interested data, respectively. In addition, the elements include the size of an associated interval data and a data entity pointer indicating a data entity of the associated interval data. The data management information items each have a doubly-linked list structure and can be moved to a position at a precede or succeed the interested data management information.

It is assumed that a data entity "x" of an interval data item is located at an offset position "of" from the beginning of the data file and accessed. In order to access the data entity "x" of the interval data item, a data management information item "n" that indicates the data entity "x" of the interval data item is searched.

Figure 6:
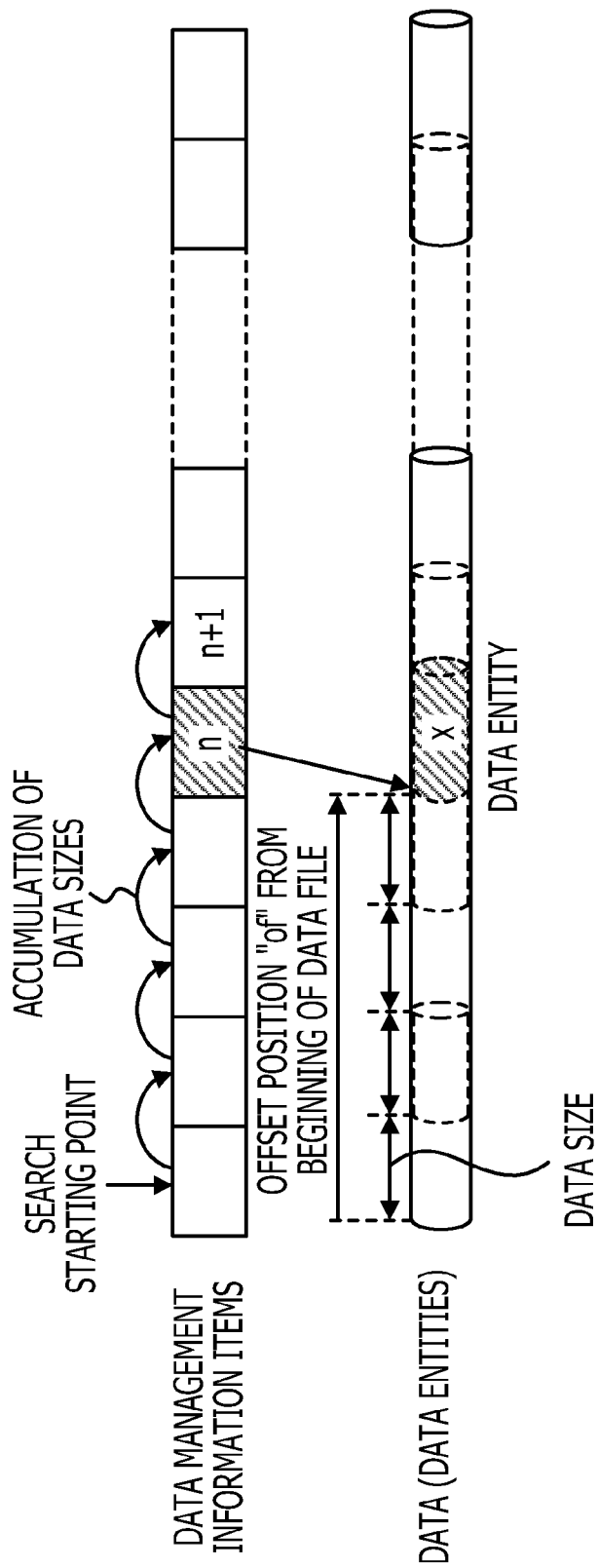
FIG. 6 is a diagram illustrating a method for determining a position of a data entity of an interval data item.

As illustrated in FIG. 6, in order to determine the position (offset position "of" from the beginning of the data file) of the data entity "x" of the interval data item, the sizes of interval data items are accumulated from the size of an interval data item indicated by the top data management information item.

The management data storage unit 32 stores a plurality of group management information items that are associated in order with the actual interval data items and data management information items and manage the information of the positions of the interval data items. The data management information items and the group management information items are examples of a first and a second management information items, respectively.

As illustrated in FIG. 5, elements of the group management information items include a preceding group management information pointer and a succeeding group management information pointer. The preceding group pointer and the succeeding group pointer indicate a group that immediately precedes or succeeds the interested group, respectively. In addition, the elements include positional information that indicates an offset position from the beginning of the data file, while the offset position is the position of an interval data item indicated by a top data management information item of a group of data management information items managed by the interested group management information item. In addition, the elements of the group management information items include the data pointer indicating the top data management information item of the group of the data management information items managed by the interested group management information item.

The group management information items each have a doubly-linked list structure and can be moved to a position at precede or succeed position of the group management information item.

A group of data management information items, which exist between a data management information item indicated by a certain group management information item and a data management information item immediately preceding a data management information item indicated by a group management information item immediately succeeding the certain group management information item, is treated as a data management information group.

The number of the group management information items is sufficiently smaller than that of the data management information items.

The group management information items and the data management information items are stored in the HDD 18. When the CPU 12 accesses the data file, the group management information items and the data management information items are read from the HDD 18. The group management information items read from the HDD 18 and the data management information items read from the HDD 18 are stored in the RAM 16. The group management information items read from the HDD 18 and the data management information items read from the HDD 18 may not be stored in the RAM 16. In this case, when the CPU 12 directly accesses the data file, the CPU 12 reads the group management information items and the data management information items from the HDD 18.

The access frequency storage unit 34 stores frequencies of access to the interval data items associated with the data management information items.

Figure 7:
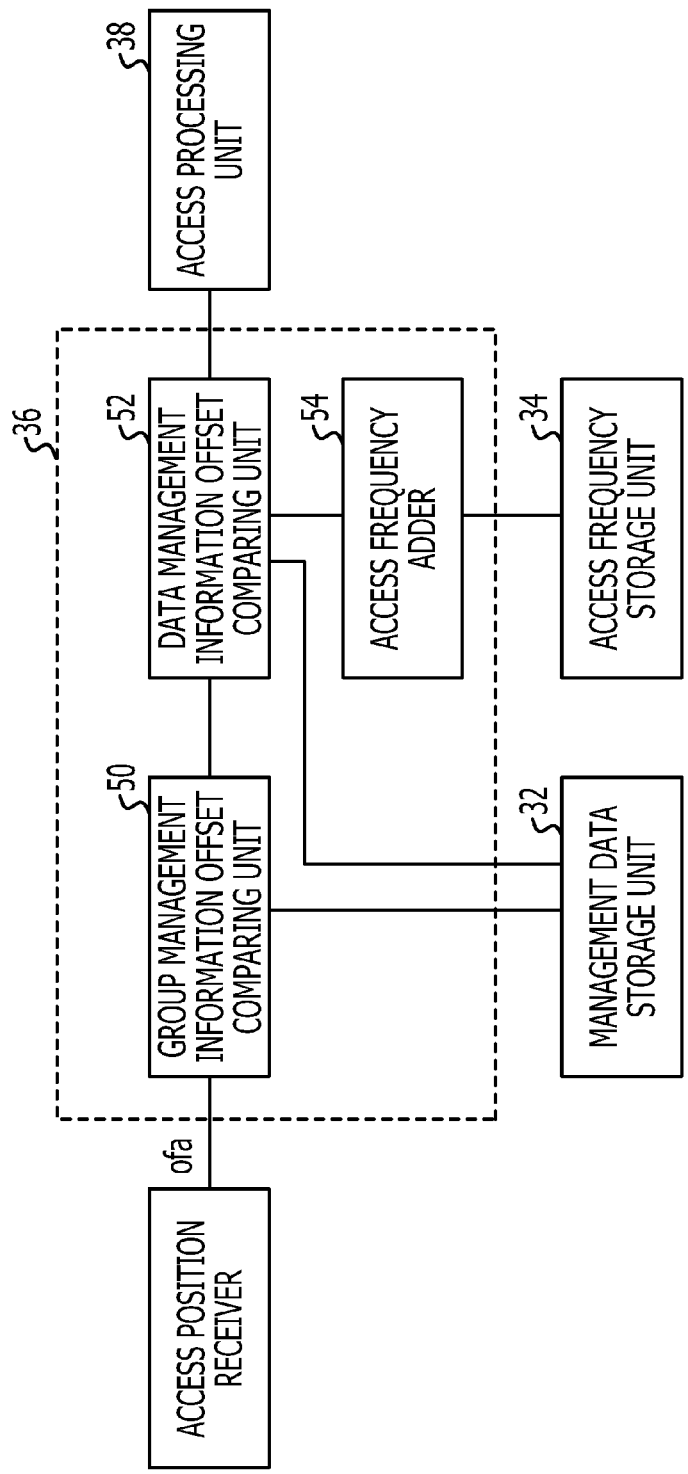
FIG. 7 is a diagram illustrating an access position determining unit included in the information processing device of the first embodiment.

When the access position determining unit 36 receives information that indicates an offset position "of a", the access position determining unit 36 determines the position (to be accessed) of the data entity "x" of the interval data item that is located at the offset position "of a" from the beginning of the data file. As illustrated in FIG. 7, the access position determining unit 36 includes a group management information offset comparing unit 50, a data management information offset comparing unit 52 and an access frequency adder 54.

The group management information offset comparing unit 50 compares the offset position "of" (indicated by positional information of a group management information item) from the beginning of the data file with the offset position "of a" (indicated by the received information) from the beginning of the data file in order from a group management information item that is a point at which search starts, or a search starting point. The group management information offset comparing unit 50 searches, based on the result of the comparison, a group management information item that is closest to the offset position "of a" (indicated by the received information) from the beginning of the data file.

The group management information offset comparing unit 50 outputs the data management information pointer of the searched group management information item to the data management information offset comparing unit 52.

The data management information offset comparing unit 52 compares the offset position "of" of the interval data item from the beginning of the data file with the offset position "of a" (indicated by the received information) from the beginning of the data file in order from a data management information item indicated by the searched group management information item. The data management information offset comparing unit 52 searches, based on the result of the comparison, a data management information item that indicates an interval data item corresponding to the offset position "of a" (indicated by the received information) from the beginning of the data file. In this case, the data management information offset comparing unit 52 sequentially accumulates data sizes, from a data size indicated by a data management information item indicated by the searched group management information item, to a data size indicated by a data management information item to be processed. The data management information offset comparing unit 52 compares the offset position "of a" (indicated by the received information) from the beginning of the data file with an offset position that is a position from the beginning of the data file and is calculated from both accumulated value and offset position that is a position from the beginning of the data file and indicated by positional information of the searched group management information item.

The data management information offset comparing unit 52 outputs the data entity pointer of the searched data management information item to the access processing unit 38. The data management information offset comparing unit 52 outputs, to the access frequency adder 54, information that indicates the searched data management information item.

The access frequency adder 54 adds 1 to an access frequency that is stored in the access frequency storage unit 34 and is a frequency of access to an interval data item associated with the searched data management information item.

The access processing unit 38 accesses a data entity of an interval data item based on the data entity pointer output from the access position determining unit 36 and outputs the data entity to the output unit 40. For example, the output unit 40 displays an image based on the data entity on the display.

Figure 8:
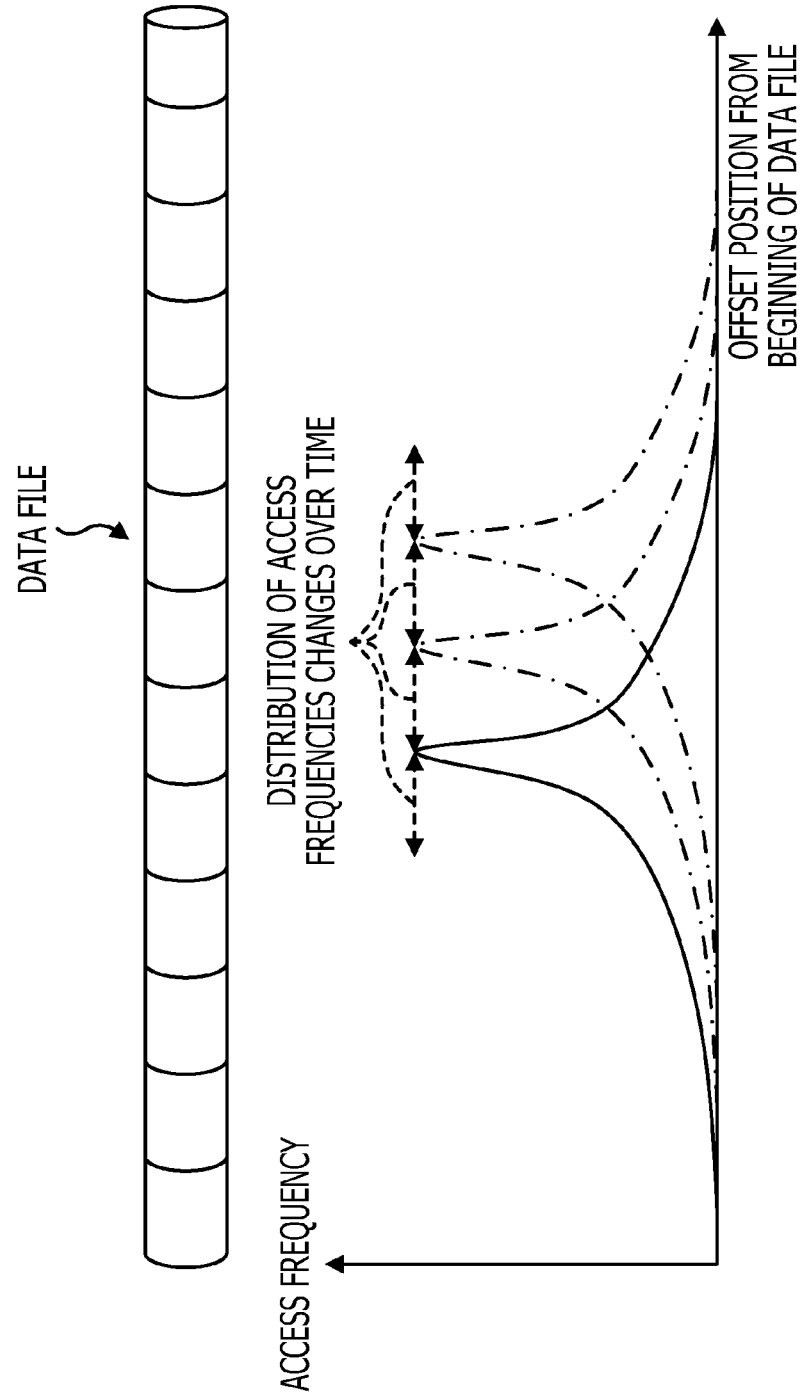
FIG. 8 is a diagram illustrating the state in which an access frequency distribution changes.

As illustrated in FIG. 8, the present embodiment describes an example in which as the aforementioned data file, a data file that has a feature in which a part of data contained in the data file is intensively accessed and a distribution of access frequencies continuously changes over time is used.

For example, it is considered that when a coded stream of a video image or the like is partially edited, data (of a GOP unit or a scene unit) that corresponds to a specific time is intensively accessed, and a location that is intensively accessed changes over time. As an example of the partial edition, a CM part that is contained in the coded stream (media data) is intensively accessed, and the coded stream is edited (referenced, changed, added, deleted, or the like).

The arrangement updating unit 42 repeatedly updates, based on access frequencies that are stored in the access frequency storage unit 34 and indicate the frequencies of access to the interval data items associated with the data management information items, an arrangement of the group management information items at predetermined time periods.

Figure 9:
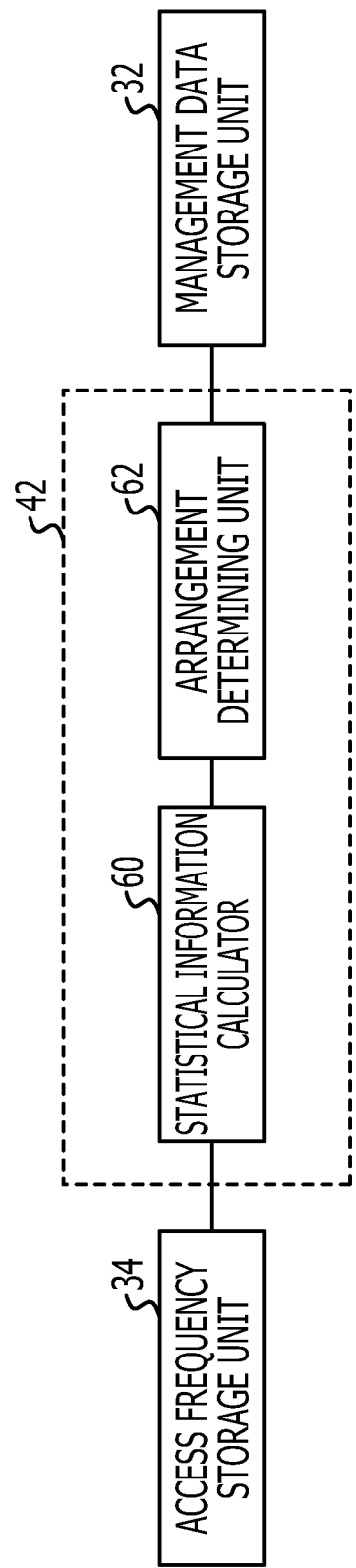
FIG. 9 is a diagram illustrating an arrangement updating unit included in the information processing device of the first embodiment.

As illustrated in FIG. 9, the arrangement updating unit 42 includes a statistical information calculator 60 and an arrangement determining unit 62.

The statistical information calculator 60 calculates, based on the access frequencies that are stored in the access frequency storage unit 34 and indicate the frequencies of access to the interval data items associated with the data management information items, an average value (hereinafter also referred to as the average of accessed positions) of accessed positions using the number of times of access as a weight in accordance with the following equation.

$$\text{Average} = \Sigma \text{ an accessed position} \times \text{a frequency of access to the position} / \Sigma \text{ the total number of the access frequencies}$$

The accessed position is represented by an identification number of a data management information item. The average of the accessed positions is an example of a position that is most frequently accessed.

The statistical information calculator 60 calculates, based on the access frequencies that are stored in the access frequency storage unit 34 and indicate the frequencies of access to the interval data items associated with the data management information items, a standard deviation of a distribution of the frequencies of access to the interval data items in accordance with the following equation.

Standard deviation=Σ(an accessed position−the average of accessed positions)$^2$×a frequency of access to the position/Σ the total number of the access frequencies A value that indicates an identification number of a data management information item is calculated as the average of the accessed positions. In addition, a value that is related to the identification number of the data management information item is calculated as the standard deviation.

The arrangement determining unit 62 specifies a data management information item that corresponds to the average of the accessed positions. The data management information pointer of the group management information item that is the point at which the search starts is set so that the set data management information pointer indicates the specified data management information item. The arrangement determining unit 62 accumulates data sizes, from a data size indicated by a top data management information item of a group management information item to which the specified data management information item belongs and that is yet to be updated, to a data size indicated by the specified data management information item. The arrangement determining unit 62 adds the accumulated value to an offset position that is a position from the beginning of the data file and indicated by positional information of the interested group management information item. Then, the arrangement determining unit 62 sets a value obtained by the addition as the positional information of the group management information item that is the point at which the search starts.

Figure 10:
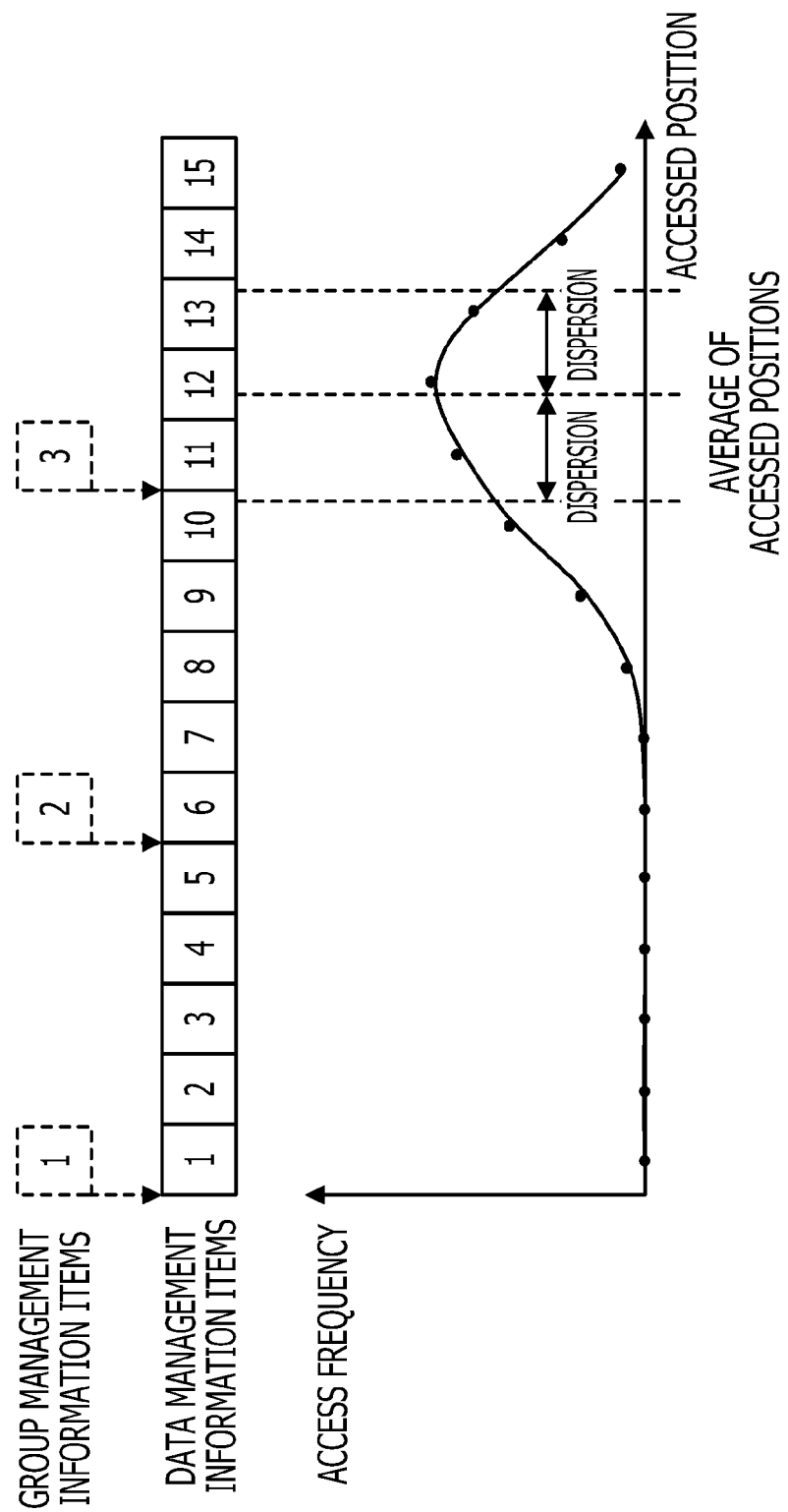
FIG. 10 is a diagram illustrating a distribution of frequencies of access to interval data items indicated by data management information items.
Figure 11:
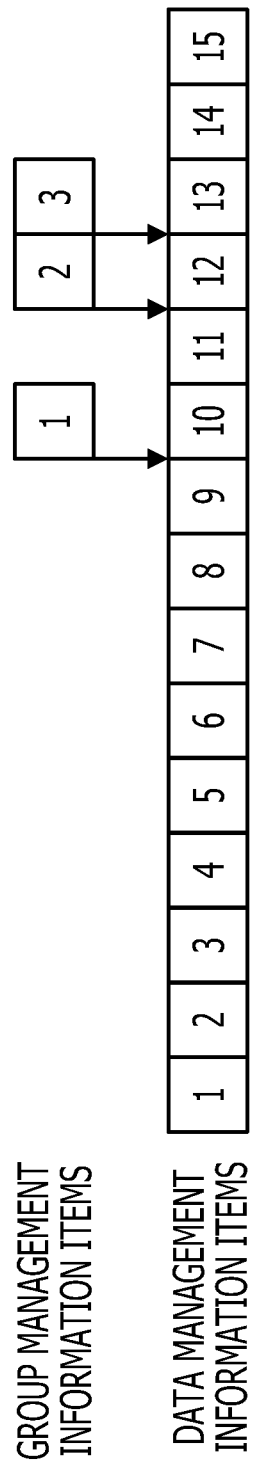
FIG. 11 is a diagram illustrating results of updating an arrangement of group management information items.

For example, as illustrated in FIG. 10, the identification number of the data management information item that corresponds to the average of the accessed positions is 12. In this case, as illustrated in FIG. 11, the arrangement determining unit 62 sets the group management information item (with an identification number 2) so that the data management information pointer of the group management information item (with the identification number 2) that is the point at which the search starts indicates the data management information item (with the identification number 12).

The arrangement determining unit 62 specifies a data management information item that corresponds to the standard deviation and is among data management information items that precede and succeed the data management information item indicated by the group management information item that is the point at which the search starts. In addition, the arrangement determining unit 62 sets a group management information item that precedes and succeeds the group management information item that is the point at which the search starts so that the set group management information item indicates the specified data management information item that precedes and succeeds the data management information item indicated by the group management information item that is the point at which the search starts. Furthermore, the arrangement determining unit 62 sets, based on the specified data management information items, positional information of the group management information items to the group management information items preceding and succeeding the group management information item that is the point at which the search starts, in the same manner as the group management information item that is the point at which the search starts.

For example, as illustrated in FIG. 10, data management information items that correspond to positions separated by the standard deviation from the average of the accessed positions have identification numbers 10 and 13. In this case, the arrangement determining unit 62 sets group management information items (with identification numbers 1 and 3) that precede and succeed the group management information item that is the point at which the search starts so that the data management information pointers of the set group management information items indicate the data management information items (with the identification numbers 10 and 13), as illustrated in FIG. 11.

As described above, the arrangement determining unit 62 may update values of the elements of the group management information items every time the updating process is performed. Alternatively, the arrangement determining unit 62 may determine the arrangement of all the group management information items after the update of the arrangement and then collectively update the values of the elements of the group management information items.

The information processing device 10 may have a general configuration of a conventional known personal computer. In the present embodiment, therefore, a description of a general process to be performed by the information processing device 10 is omitted.

Next, effects of the first embodiment are described.

Figure 12:
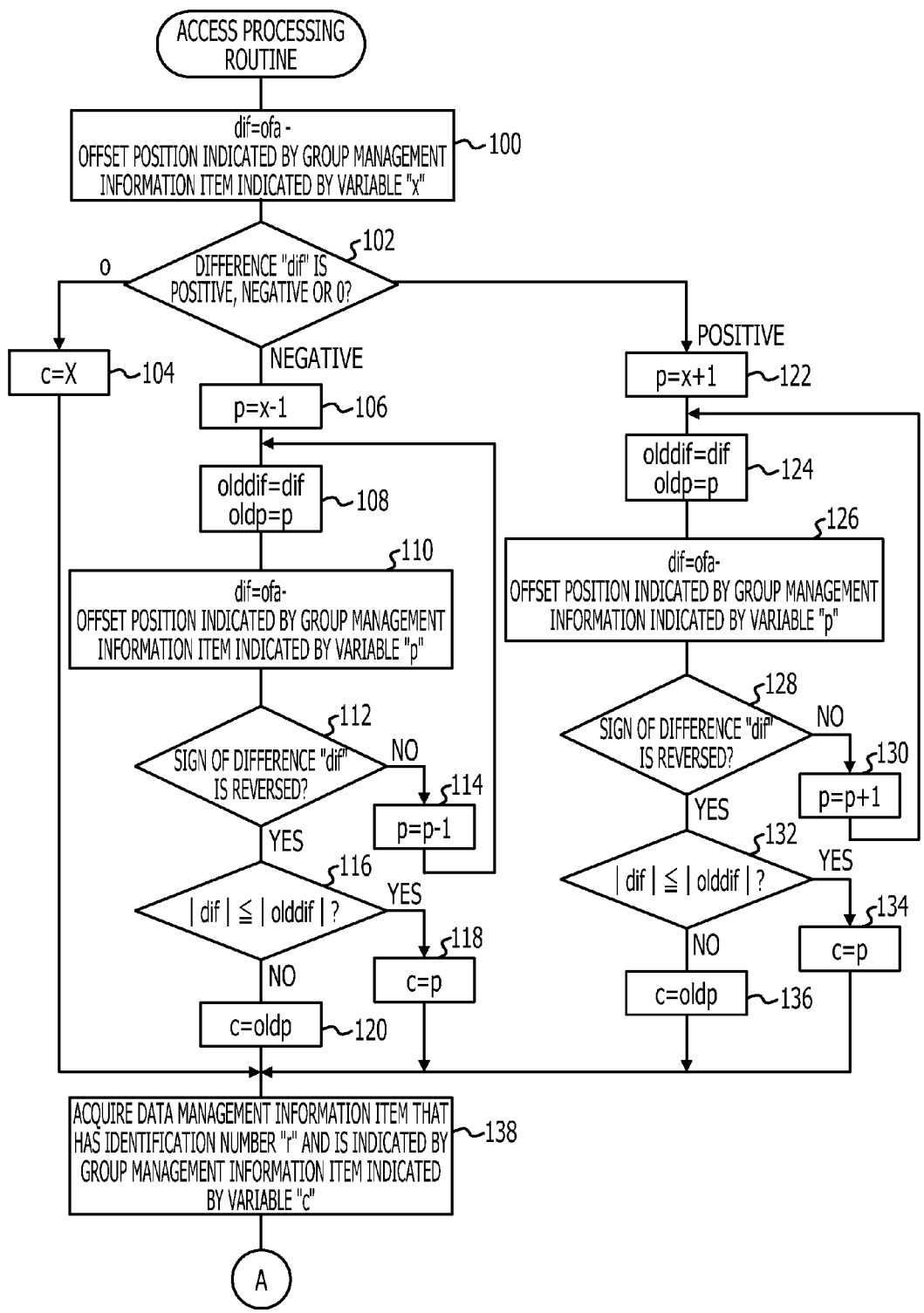
FIG. 12 is a flowchart of procedures of an access processing routine that is executed by the information processing device of the first embodiment.
Figure 13:
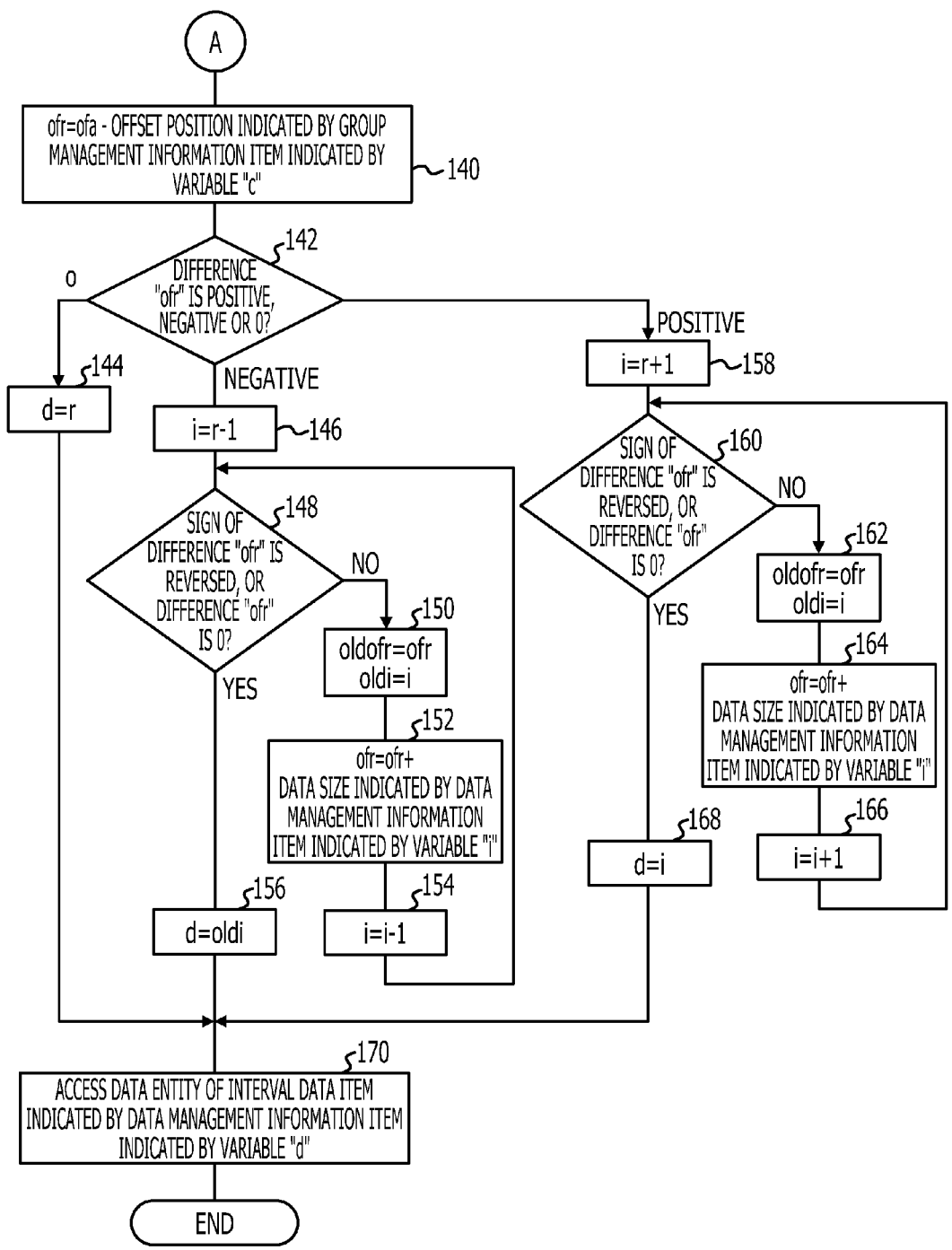
FIG. 13 is a flowchart of procedures of the access processing routine that is executed by the information processing device of the first embodiment.

When a user operates an operating unit (not illustrated) and enters, in the information processing device 10, the offset position "of a" that is the position from the beginning of the data file to be accessed, the CPU 12 of the information processing device 10 executes the access processing routine illustrated in FIGS. 12 and 13.

In operation 100, the CPU 12 reads, from the management data storage unit 32, a group management information item "x" that is a search starting point, and the CPU 12 acquires an offset position that indicates a position from the beginning of the data file and is indicated by positional information of the group management information item "x". The CPU 12 subtracts the acquired offset position from the offset position "of a" that is indicated by the received information and indicates the position from the beginning of the data file. Thus, the CPU 12 calculates the difference "dif" between the acquired offset position and the offset position "of a".

In operation 102, the CPU 12 determines whether the difference "dif" calculated in the aforementioned operation 100 is positive, negative or 0. When the calculated difference "dif" is 0, the CPU 12 sets an identification number "x" to a variable "c" that indicates an identification number of a group management information item as a search result in operation 104. Then, the CPU 12 causes the access processing routine to proceed to operation 138 (described later).

When the calculated difference "dif" is negative, the CPU 12 sets an identification number "x−1" to a variable "p" that indicates an identification number of a targeted group management information item in operation 106. Then, the CPU 12 sets the calculated difference "dif" to a variable "olfdif" that indicates a previously calculated difference, and the CPU 12 sets the variable "p" to a variable "oldp" that indicates an identification number of a previously targeted group management information item in operation 108.

In operation 110, the CPU 12 reads the group management information item indicated by the variable "p" from the management data storage unit 32 and acquires an offset position that indicates a position from the beginning of the data file and is indicated by positional information of the group management information item indicated by the variable "p". The CPU 12 subtracts the acquired offset position from the offset position "of a" that is indicated by the received information and indicates the position from the beginning of the data file. Thus, the CPU 12 calculates the difference "dif" between the acquired offset position and the offset position "of a". In operation 112, the CPU 12 compares the calculated difference "dif" with the variable "olddif" and determines whether or not the sign of the difference "dif" is reversed. When the CPU 12 determines that the sign of the difference "dif" is not reversed, the CPU 12 decrements the variable "p" by 1 in operation 114 and causes the access processing routine to return to the aforementioned operation 108. On the other hand, when the CPU 12 determines that the sign of the difference "dif" is reversed in the aforementioned operation 112, the CPU 12 determines whether or not an absolute value of the calculated difference "dif" is equal to or smaller than an absolute value of the variable "olddif" in operation 116. When the CPU 12 determines that the absolute value of the calculated difference "dif" is equal to or smaller than the absolute value of the variable "olddif", the CPU 12 sets the variable "p" to the variable "c" in operation 118 and causes the access processing routine to proceed to operation 138. On the other hand, when the CPU 12 determines that the absolute value of the calculated difference "dif" is larger than the absolute value of the variable "olddif", the CPU 12 sets the variable "oldp" to the variable "c" in operation 120 and causes the access processing routine to proceed to operation 138.

When the CPU 12 determines that the calculated difference "dif" is positive in the aforementioned operation 102, the CPU 12 sets an identification number "x+1" to the variable "p" that indicates the identification number of the targeted group management information item in operation 122. In operation 124, the CPU 12 sets the calculated difference "dif" to the variable "olddif" that indicates the previously calculated difference, and the CPU 12 sets the variable "p" to the variable "oldp" that indicates the identification number of the previously targeted group management information item.

In operation 126, the CPU 12 reads, from the management data storage unit 32, the group management information item indicated by the variable "p" and acquires an offset position that indicates a position from the beginning of the data file and is indicated by the positional information of the group management information item indicated by the variable "p". The CPU 12 subtracts the acquired offset position from the offset position "of a" that is indicated by the received information and indicates the position from the beginning of the data file. Thus, the CPU 12 calculates the difference "dif" between the acquired offset position and the offset position "of a". Then, in operation 128, the CPU 12 compares the calculated difference "dif" with the variable "olddif" and determines whether or not the sign of the calculated difference "dif" is reversed. When the CPU 12 determines that the sign of the calculated difference "dif" is not reversed in operation 128, the CPU 12 increments the variable "p" by 1 in operation 130 and causes the access processing routine to return to the aforementioned operation 124. On the other hand, when the CPU determines that the sign of the calculated difference "dif" is reversed in the aforementioned operation 128, the CPU 12 determines whether or not the absolute value of the calculated difference "dif" is equal to or smaller than the absolute value of the variable "olddif" in operation 132. When the CPU 12 determines that the absolute value of the calculated difference "dif" is equal to or smaller than the absolute value of the variable "olddif", the CPU 12 sets the variable "p" to the variable "c" in operation 134 and causes the access processing routine to proceed to operation 138. On the other hand, when the CPU 12 determines that the absolute value of the calculated difference "dif" is larger than the absolute value of the variable "olddif", the CPU 12 sets the variable "oldp" to the variable "c" in operation 136 and causes the access processing routine to proceed to operation 138.

In operation 138, the CPU 12 reads, from the management data storage unit 32, the group management information item indicated by the variable "c", and acquires a data management information item with an identification number "r" using the data management information pointer of the group management information item indicated by the variable "c".

In operation 140, the CPU 12 acquires an offset position that indicates a position from the beginning of the data file and is indicated by the positional information of the group management information item indicated by the variable "c". The CPU 12 subtracts the acquired offset position from the offset position "of a" that is indicated by the received information and indicates the position from the beginning of the data file. Thus, the CPU 12 calculates the difference "ofr" between the acquired offset position and the offset position "of a".

In operation 142, the CPU 12 determines whether the difference "ofr" calculated in the aforementioned operation 140 is positive, negative or 0. When the CPU 12 determines that the calculated difference "ofr" is 0, the CPU 12 sets the identification number "r" to a variable "d" that indicates an identification number of a data management information item as a search result in operation 144. Then, the CPU 12 causes the access processing routine to proceed to operation 170 (described later).

When the CPU 12 determines that the calculated difference "ofr" is negative, the CPU 12 sets an identification number "r–1" to a variable "i" that indicates an identification number of a targeted data management information item in operation 146. Then, in operation 148, the CPU 12 compares the calculated difference "ofr" with a variable "oldofr" and determines whether or not the sign of the difference "ofr" is reversed and the difference "ofr" is 0. When the CPU 12 determines that the sign of the difference "ofr" is not reversed and the difference "ofr" is not 0, the CPU 12 causes the access processing routine to proceed to operation 150. In operation 150, the CPU 12 sets the calculated difference "ofr" to the variable "oldofr" that indicates a previously calculated difference, and the CPU 12 sets the variable "i" to a variable "oldi" that indicates an identification number of a previously targeted data management information item. Then, in operation 152, the CPU 12 adds a data size indicated by the data management information item indicated by the variable "i" to the difference "ofr" and thereby updates the difference "ofr". In the next operation 154, the CPU 12 decrements the variable "i" by 1. Then, the CPU 12 causes the access processing routine to return to the aforementioned operation 148.

On the other hand, when the CPU 12 determines that the sign of the difference "ofr" is reversed in the aforementioned operation 148 or when the CPU 12 determines that the difference "ofr" is 0 in the aforementioned operation 148, the CPU 12 sets the variable "oldi" to the variable "d" in operation 156. Then, the CPU 12 causes the access processing routine to proceed to operation 170.

When the CPU 12 determines that the calculated difference "ofr" is positive in the aforementioned operation 142, the CPU 12 sets an identification number "r+1" to the variable "i" that indicates the identification number of the targeted data management information item in operation 158. Then, in operation 160, the CPU 12 compares the calculated difference "ofr" with the variable "oldofr" and determines whether or not the sign of the difference "ofr" is reversed and the difference "ofr" is 0. When the CPU 12 determines that the sign of the difference "ofr" is not reversed and the difference "ofr" is not 0, the CPU 12 causes the access processing routine to proceed to operation 162. In operation 162, the CPU 12 sets the calculated difference "ofr" to the variable "oldofr" that indicates the previously calculated difference, and the CPU 12 sets the variable "i" to the variable "oldi" that indicates the identification number of the previously targeted data management information item. Then, in operation 164, the CPU 12 subtracts a data size indicated by the data management information item indicated by the variable "i" from the difference "ofr" and thereby updates the difference "ofr". In the next operation 166, the CPU 12 increments the variable "i" by 1. Then, the CPU 12 causes the access processing routine to return to the aforementioned operation 148.

On the other hand, when the CPU 12 determines that the sign of the difference "ofr" is reversed in the aforementioned operation 160 or when the CPU 12 determines that the difference "ofr" is 0, the CPU 12 sets the variable "i" to the variable "d" in operation 168. Then, the CPU 12 causes the access processing routine to proceed to operation 170.

In operation 170, the CPU 12 reads, from the management data storage unit 32, the data management information item indicated by the variable "d", uses the data entity pointer of the data management information item indicated by the variable "d" and accesses a data entity of an interval data item indicated by the data management information item indicated by the variable "d". Then, the CPU 12 terminates the access processing routine. In this case, the CPU 12 adds 1 to an access frequency that is stored in the access frequency storage unit 34 and indicates a frequency of access to the interval data item associated with the data management information item indicated by the variable "d".

Figure 14:
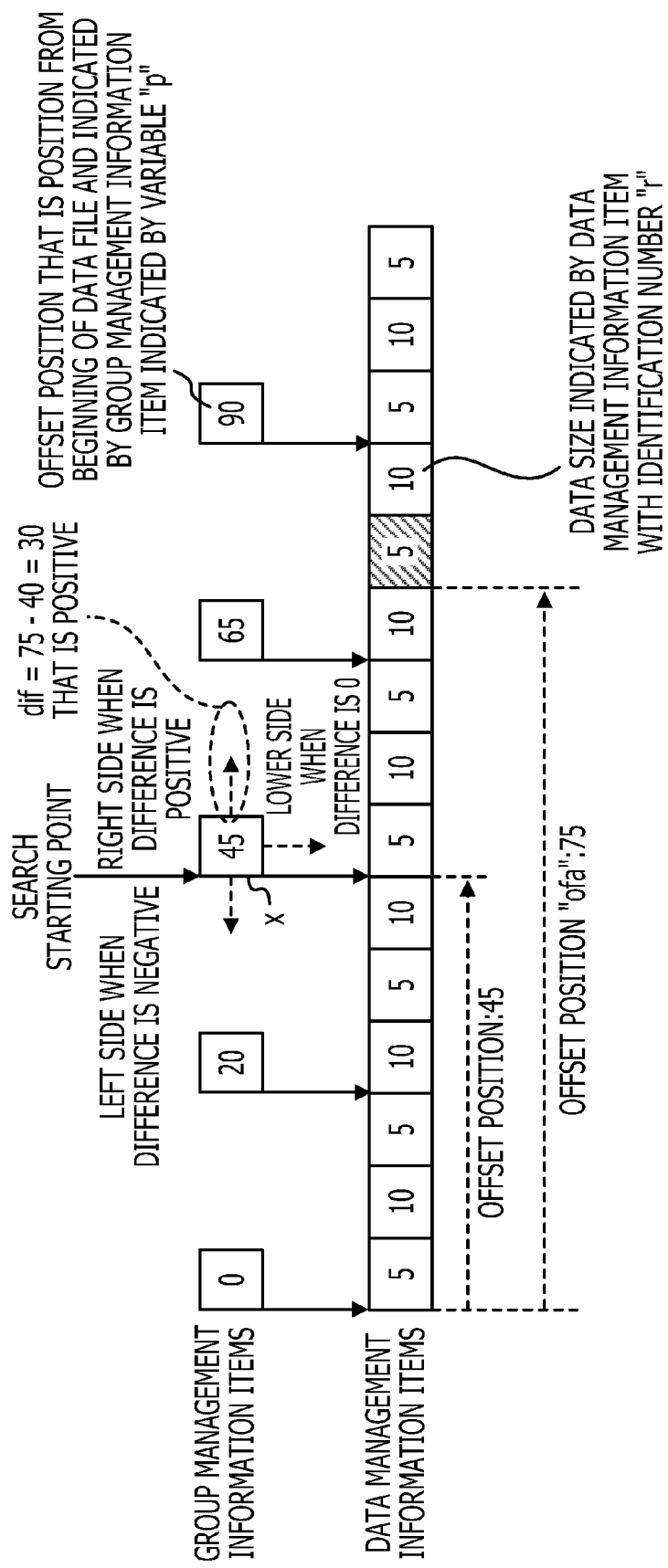
FIG. 14 is a diagram illustrating a method for searching a group management information item.

A specific example of a process of accessing a data entity in accordance with the access processing routine to be performed by the CPU 12 in the aforementioned manner is described below. For example, as illustrated in FIG. 14, the case in which the group management information items and the data management information items are already set is described below.

Figure 15:
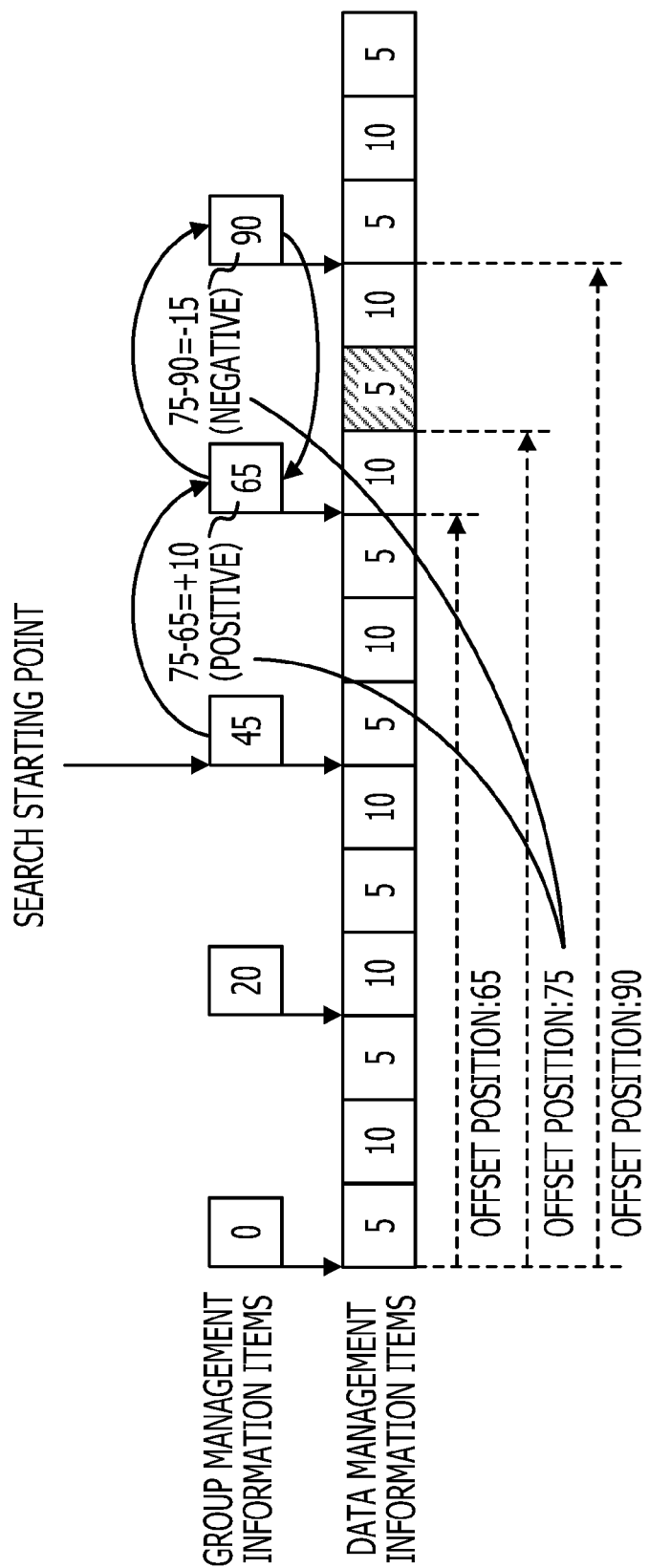
FIG. 15 is a diagram illustrating a method for searching a group management information item.

It is assumed that the offset position "of a" that is indicated by the received information and indicates the position of the data entity (that is to be accessed and is contained in the data file to be accessed) from the beginning of the data file is 75 and an offset position that indicates the position of a data entity from the beginning of the data file and is indicated by a group management information item "x" that is a search starting point is 45. The difference "dif" between the offset position "of a" and the offset position is +30. As illustrated in FIG. 15, the CPU 12 searches a group management information item that succeeds the group management information item "x" that is the point at which the search starts.

The CPU 12 searches the group management information item until the sign of the difference between the offset position "of a" indicating the position (from the beginning of the data file) of the data entity to be accessed and an offset position indicating the position (from the beginning of the data file) of a data entity indicated by a group management information item indicated by the variable "p" is reversed.

As illustrated in FIG. 15, when the offset position that indicates the position (from the beginning of the data file) of the data entity indicated by the group management information item indicated by the variable "p" is 65, the difference between the offset position "of a" and the offset position is +10 (=75−65). In addition, when the offset position that indicates the position (from the beginning of the data file) of the data entity indicated by the group management information item indicated by the variable "p" is 90, the difference between the offset position "of a" and the offset position is −15 (=75−90). Thus, the sign of the difference is reversed. It is, therefore, apparent that the data entity to be accessed exists between the data entities indicated by the group management information items indicated by the variable "p". The CPU 12 selects the group management information item that is indicated by the variable "p" and causes the difference between the offset position "of a" and the offset position (that is 65 from the beginning of the data file) to be smaller. Then, the CPU 12 acquires the pointers of the data management information item with the identification number "r" from elements of the selected group management information item indicated by the variable p (=c).

Figure 16:
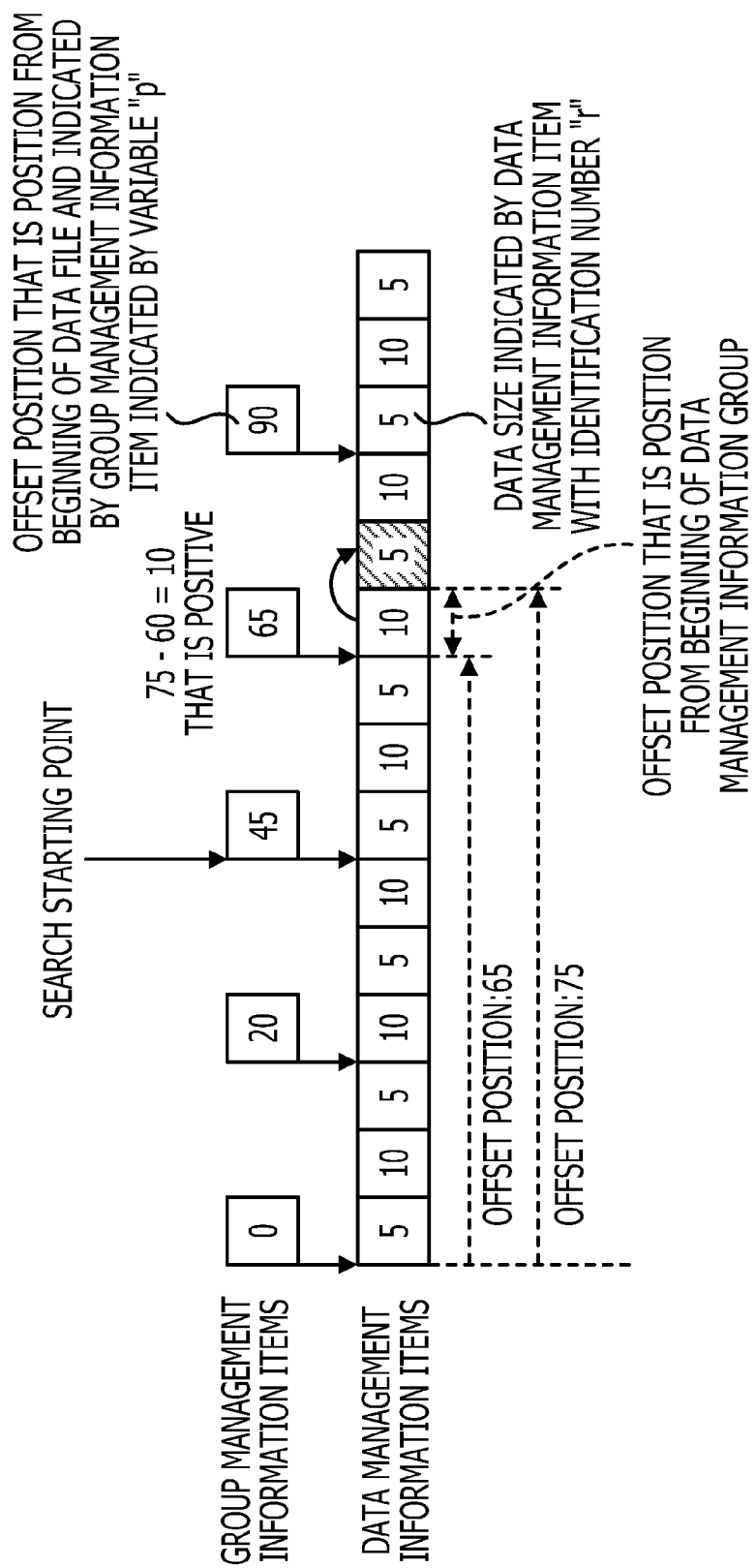
FIG. 16 is a diagram illustrating a method for searching a data management information item.

Next, the CPU 12 determines a searching direction based on the sign of the difference "ofr" between the offset position "of a" and the offset position that indicates the position of the data entity indicated by the selected group management information p (=c) from the beginning of the data file. In FIG. 16, the offset position "of a" is 75, the offset position that indicates the position of the data entity indicated by the data management information item from the beginning of the data file is 65, and the difference "ofr" is 75−65=+10. Thus, the CPU 12 searches a data management information item that succeeds the data management information item that has the identification number "r" and is indicated by the selected group management information item p (=c).

The CPU 12 calculates the difference between the difference "ofr" and an accumulated value of data sizes up to a data size indicated by the targeted data management information item "i" and determines whether or not the calculated difference is 0 and the sign of the calculated difference is reversed, and whereby the CPU 12 determines a data management information item that is indicated by the variable "d" and indicates the position of a data entity to be accessed. The difference between the offset position "of a" and the offset position that indicates the position of a data entity from the beginning of the data file and is indicated by the selected group management information item is +10, and the data size that is indicated by the targeted data management information item with the identification number "r" (r=i) is 10. Thus, the difference between the difference "ofr" and the accumulated value of the data sizes up to the data size indicated by the targeted data management information item "i" is 0. Thus, the data entity to be accessed is a data entity of an interval data item indicated by the data management information item with the identification number "r" (r=d). Therefore, the CPU 12 treats the data management information item with the identification number "r" (r=d) as the search result.

Figure 17:
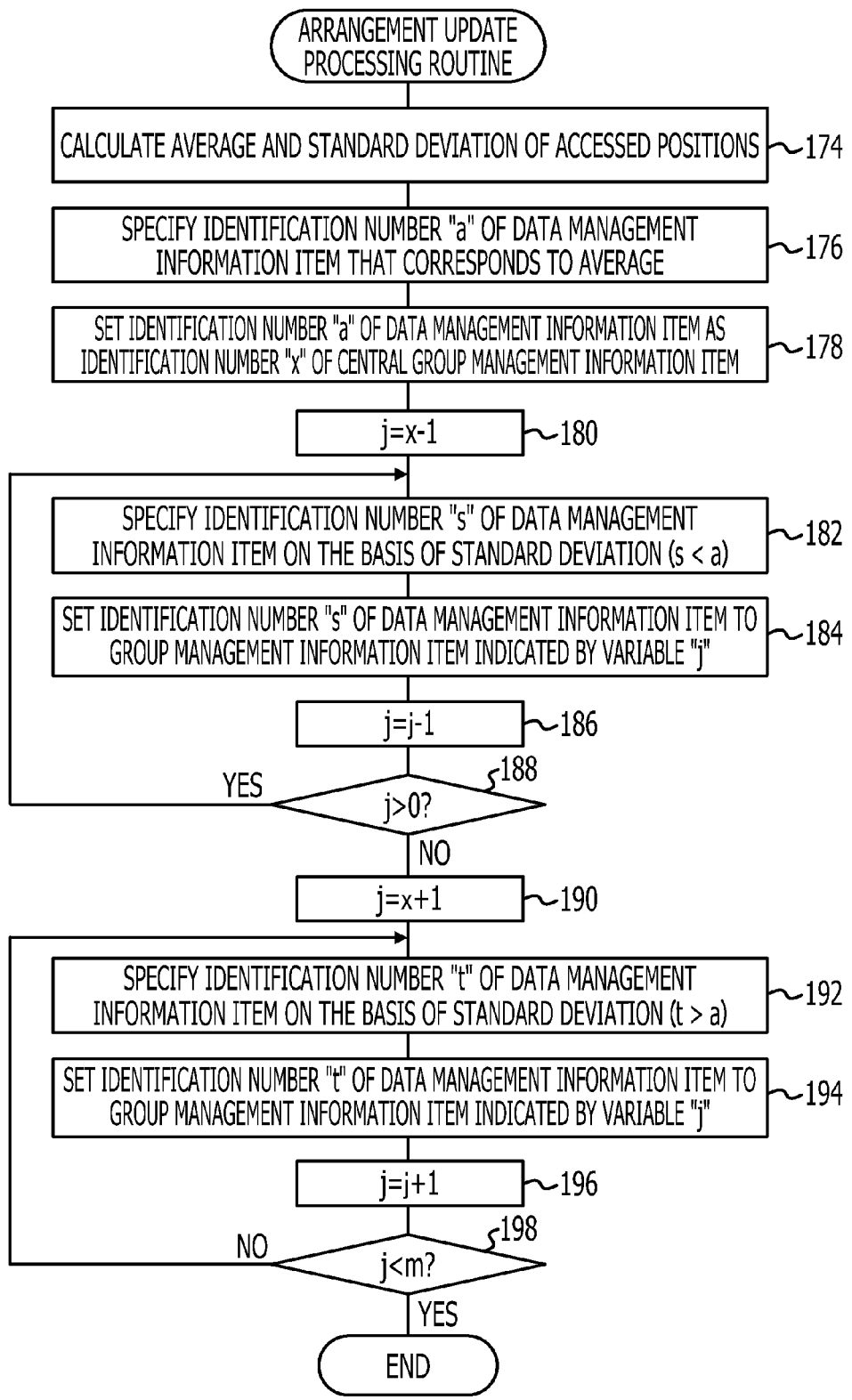
FIG. 17 is a flowchart of procedures of an arrangement update processing routine that is executed by the information processing device of the first embodiment.

Next, the CPU 12 of the information processing device 10 repeatedly executes the arrangement update processing routine (illustrated in FIG. 17) at predetermined time intervals. Each of the predetermined time intervals may be a time period in which the total number of access frequencies reaches a predetermined value. In addition, each of the predetermined time intervals may be a time period in which a predetermined time elapses.

In operation 174, the CPU 12 reads, from the access frequency storage unit 34, a frequency of access to each of the interval data items associated with the data management information items. The CPU 12 calculates, based on the read frequency of access to each of the interval data items associated with the data management information items, the average of accessed positions and a standard deviation of the accessed positions.

In operation 176, the CPU 12 specifies an identification number "a" of a data management information item that corresponds to the average (of the accessed positions) calculated in the aforementioned operation 174. In the next operation 178, the CPU 12 sets the identification number "a" (of the data management information item) specified in the aforementioned operation 176 as the identification number "x" of the central data management information item that is the search starting point. In this case, the CPU 12 sets, as the identification number "x" of the central data management information item, a value obtained by dividing the maximum value of identification numbers of the group management information items by 2 and rounding up a decimal number of the divided value.

In operation 180, the CPU 12 sets a value "x−1" to a variable "j" that indicates an identification number of a targeted group management information item. In the next operation 182, the CPU 12 specifies, based on the standard deviation (of the accessed positions) calculated in the aforementioned operation 174, an identification number "s" of a data management information item that precedes the data management information item that has the identification number "a". In operation 184, the CPU 12 sets, to the data management information pointer of the group management information item indicated by the variable "j", a pointer that indicates the data management information item with the identification number "s" specified in the aforementioned operation 182.

In operation 186, the CPU 12 decrements, by 1, the variable "j" that indicates the identification number. In operation 188, the CPU 12 determines whether or not the variable "j" is larger than 0. When the variable "j" is larger than 0, the CPU 12 causes the arrangement update processing routine to return to the aforementioned operation 182. On the other hand, when the variable "j" is equal to or smaller than 0, the CPU 12 sets a value "x+1" to the variable "j" that indicates the identification number of the targeted group management information item in operation 190.

In the next operation 192, the CPU 12 specifies, based on the standard deviation (of the accessed positions) calculated in the aforementioned operation 174, an identification number "t" of a data management information item that succeeds the data management information item that has the identification number "a". In operation 194, the CPU 12 sets, to the data management information pointer of the group management information item indicated by the variable "j", a pointer that indicates the data management information item that has the identification number "t" specified in the aforementioned operation 192.

In operation 196, the CPU 12 increments, by 1, the variable "j" that indicates the identification number. In operation 198, the CPU 12 determines whether or not the variable "j" is smaller than a constant "m" that indicates the maximum value of the identification numbers of the group management information items. When the variable "j" is smaller than the constant "m", the CPU 12 causes the arrangement update processing routine to return to the aforementioned operation 192. On the other hand, when the variable "j" reaches the constant "m", the CPU 12 terminates the arrangement update processing routine.

A specific example of a process of updating the arrangement of the group management information items in accordance with the arrangement update processing routine to be performed by the CPU 12 in the aforementioned manner is described below. For example, the case in which frequencies of access to the data management information items are distributed as illustrated in FIG. 10 are described below as an example.

Figure 18:
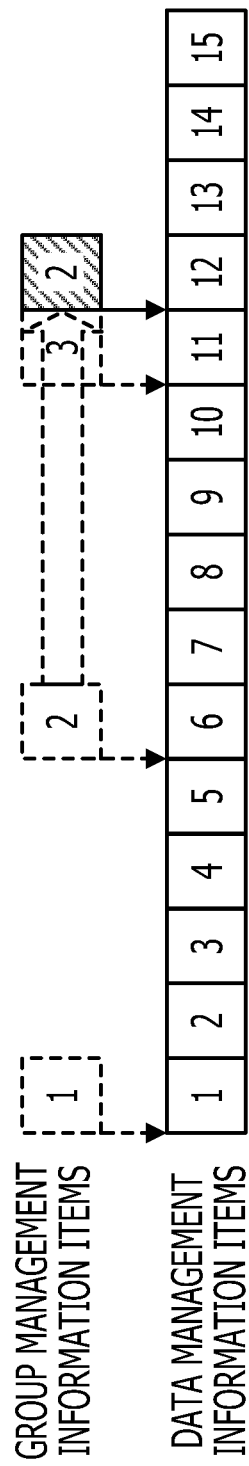
FIG. 18 is a diagram illustrating a state in which the arrangement of the group management information items is updated.

As illustrated in FIG. 18, the CPU 12 sets, to the data management information pointer of the central group management information item (with the identification number 2) that is the point at which the search starts, a pointer that indicates the data management information item (with the identification number 12) that corresponds to the average of the accessed positions. The CPU 12 calculates, based on an accumulated total value of data sizes indicated by data management information items up to a data management information item immediately preceding the data management information item corresponding to the average of the accessed positions, an offset position of a data entity indicated by the data management information item corresponding to the average of the accessed positions, while the offset position of the data entity indicates the position of the data entity from the beginning of the data file. The CPU 12 sets the calculated offset position to the positional information of the central group management information item (with the identification number 2).

Figure 19:
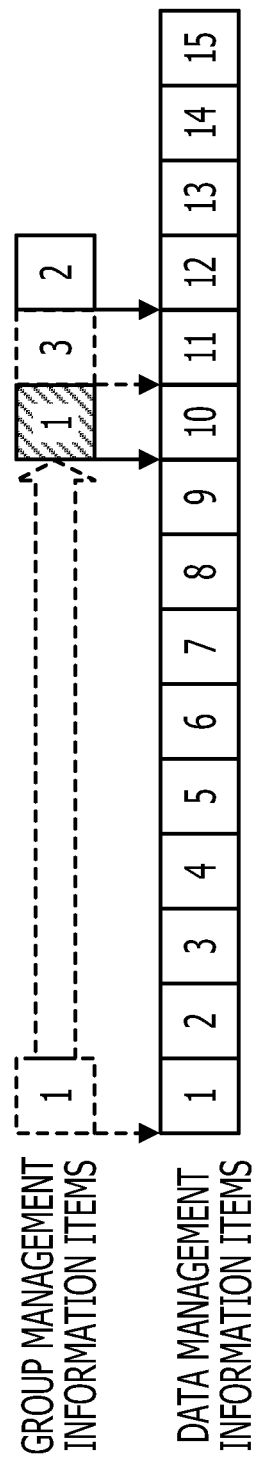
FIG. 19 is a diagram illustrating another state in which the arrangement of the group management information items is updated.

As illustrated in FIG. 19, the CPU 12 sets, to a data management information pointer of a group management information item (with an identification number 1) that has the identification number that is smaller than the identification number of the central group management information item, a pointer that indicates a data management information item (with an identification number 10). The identification number 10 is the identification number of the data management information item that corresponds to a position that is separated by a standard deviation "s" of the accessed positions from the data management information item indicated by the central group management information item and is located on the side on which the identification number is smaller than the identification number of the data management information item indicated by the central group management information item.

The CPU 12 calculates, based on an accumulated total value of data sizes indicated by data management information items up to a data management information item preceding the data management information item with the identification number 10, an offset position of a data entity indicated by the data management information item (with the identification number 10), while the offset position of the data entity indicates the position of the data entity from the beginning of the data file. The CPU 12 sets the calculated offset position to the positional information of the group management information item (with the identification number 1).

Figure 20:
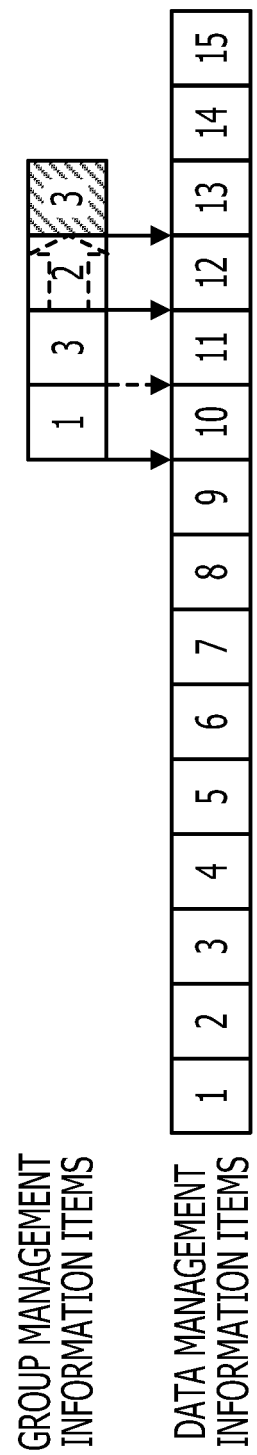
FIG. 20 is a diagram illustrating another state in which the arrangement of the group management information items is updated.

As illustrated in FIG. 20, the CPU 12 sets, to a data management information pointer of a group management information item (with an identification number 3) that has the identification number that is larger than the identification number of the central group management information item, a pointer that indicates a data management information item (with an identification number 13). The identification number 13 is the identification number of the data management information item that corresponds to a position that is separated by the standard deviation "s" of the accessed positions from the data management information item indicated by the central group management information item and is located on the side on which the identification number is larger than the identification number of the data management information item indicated by the central group management information item. The CPU 12 calculates, based on an accumulated total value of data sizes indicated by data management information items up to a data management information item preceding the data management information item with the identification number 13, an offset position of a data entity indicated by the data management information item with the identification number 13, while the offset position of the data entity indicates the position of the data entity from the beginning of the data file. The CPU 12 sets the calculated offset position to the positional information of the group management information item (with the identification number 3).

The user operates the operating unit (not illustrated) and enters, in the information processing device 10, an instruction to insert a data entity of an interval data item in the data file and thereby place the data entity at a predetermined offset position that indicates the position of the data entity from the beginning of the data file. In this case, the CPU 12 of the information processing device 10 updates the group management information items stored in the management data storage unit 32 and the data management information items stored in the management data storage unit 32 as described below.

First, the CPU 12 searches a data management information item that corresponds to the offset position that is indicated by the received information and indicates the position from the beginning of the data file, in a similar manner to the aforementioned access processing routine.

Figure 21:
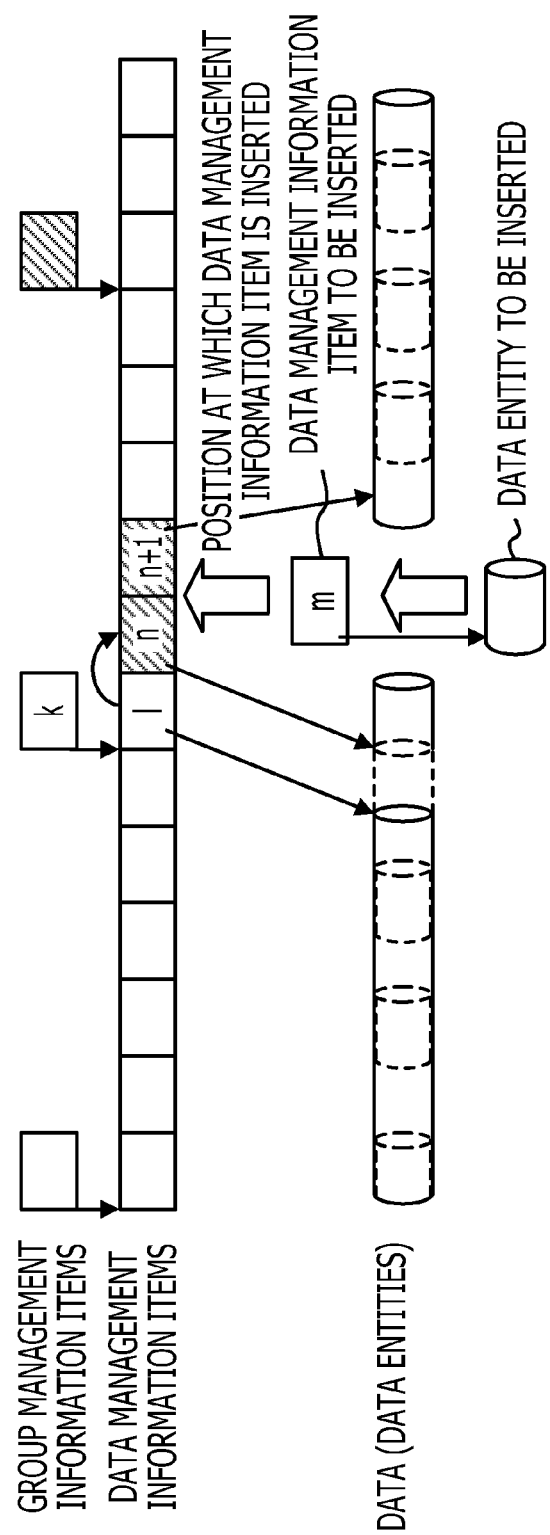
FIG. 21 is a diagram illustrating a method for inserting an interval data item in a data file.

For example, as illustrated in FIG. 21, when an instruction to insert a data entity of an interval data item in the data file and place the data entity at an offset position between two interval data items from the beginning of the data file is entered in the information processing device 10, the CPU 12 searches data management information items "n" and "n+1" that indicate the two interval data items.

The CPU 12 changes the succeeding data management information pointer of the data management information item "n" and the preceding data management information pointer of the data management information item "n+1" so that the succeeding data management information pointer of the data management information item "n" and the preceding data management information pointer of the data management information item "n+1" indicate a data management information item "m" that indicates the interval data item to be inserted. In addition, the CPU 12 adds the data size of the inserted interval data item to positional information (offset positions from the beginning of the data file) of group management information items that succeed the inserted data management information item "m". In this manner, the CPU 12 updates the positional information of each of the group management information items.

Figure 22:
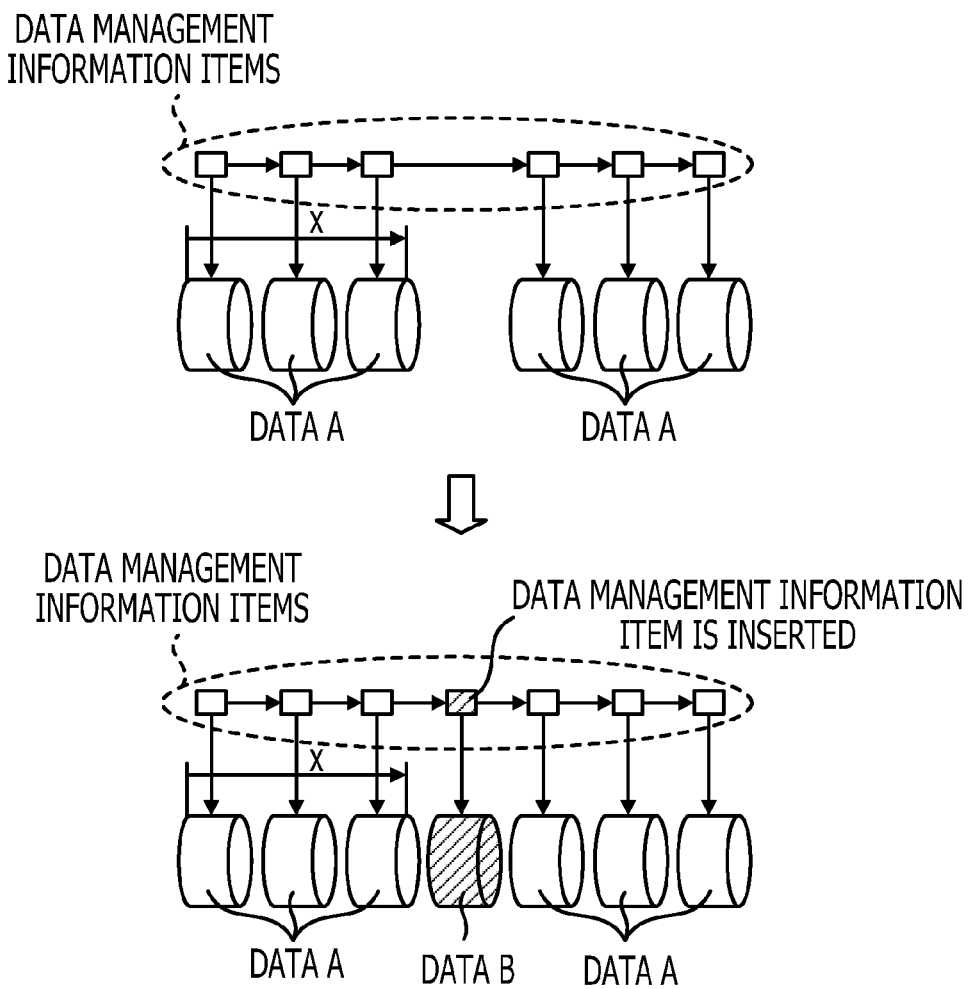
FIG. 22 is a diagram illustrating a state in which the interval data item is inserted in the data file.

In the aforementioned process, the data management information item is inserted in order to insert the interval data item in the data file as illustrated in FIG. 22.

The user operates the operating unit (not illustrated) and enters, in the information processing device 10, an instruction to delete a data entity of an interval data item located at a predetermined offset position that indicates a position from the beginning of the data file. In this case, the CPU 12 of the information processing device 10 updates the group management information items stored in the management data storage unit 32 and the data management information items stored in the management data storage unit 32 as described below.

First, the CPU 12 searches a data management information item that corresponds to the predetermined offset position that is indicated by the received information and indicates the position from the beginning of the data file, in a similar manner to the aforementioned access processing routine.

For example, when the user enters an instruction to delete a certain interval data item in the information processing device 10, the CPU 12 searches a data management information item "n" that indicates the certain interval data item.

The CPU 12 changes a succeeding data management information pointer of a data management information item "n−1" so that the succeeding data management information pointer of the data management information item "n−1" indicates a data management information item "n+1" that immediately succeeds the searched data management information item "n". In addition, the CPU 12 changes a preceding data management information pointer of the data management information item "n+1" so that the preceding data management information pointer of the data management information item "n+1" indicates the data management information item "n−1" that immediately precedes the searched data management information item "n". In addition, the CPU 12 subtracts the data size of the deleted interval data item from positional information (offset positions from the beginning of the data file) of group management information items that succeed the data management information item "n". In this manner, the CPU 12 updates the positional information of each of the group management information items that succeed the data management information item "n".

Next, results of a data access test that was performed using the method of the present embodiment are described. While data access of which frequencies are distributed as indicated in the following Table 1 was assumed, the arrangement of the group management information items was updated.

TABLE 1

| | Accessed position | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Access frequency | 0 | 0 | 0 | 0 | 0 | 0 | 0 | 1 | 3 | 6 | 9 | 12 | 9 | 5 | 1 |

Statistical information (of the data access) that is calculated from the Table 1 is indicated in Table 2.

TABLE 2

| | |
|---|---|
| The average "a" of the accessed positions | 11.7 |
| The standard deviation | 1.6 |

The arrangement of the group management information items was updated based on Table 2 and the following Table 3.

TABLE 3

| | |
|---|---|
| The identification number of the group management information item that is the point at which the search starts | 12 |
| Intervals at which the group management information items are arranged | 1.6 |

Figure 23:
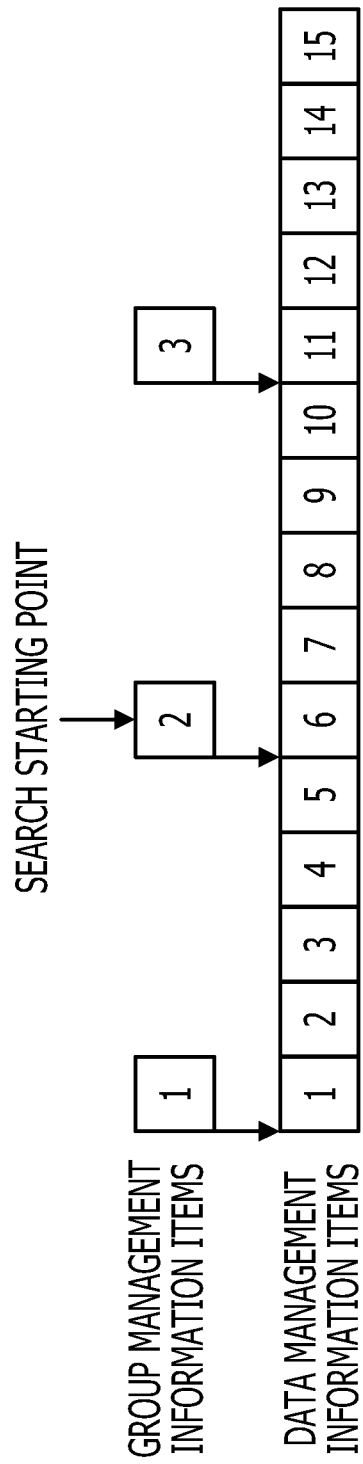
FIG. 23 is a diagram illustrating a comparative arrangement of group management information items.

As a comparative example in which the method of the present embodiment is not used, three group management information items are arranged at equal intervals for all the data management information items as illustrated in FIG. 23 and a data access test was performed in the same manner as described above. In the data access test, "the point at which the search starts" was set to the central group management information item (with the identification number 2).

Figure 24:
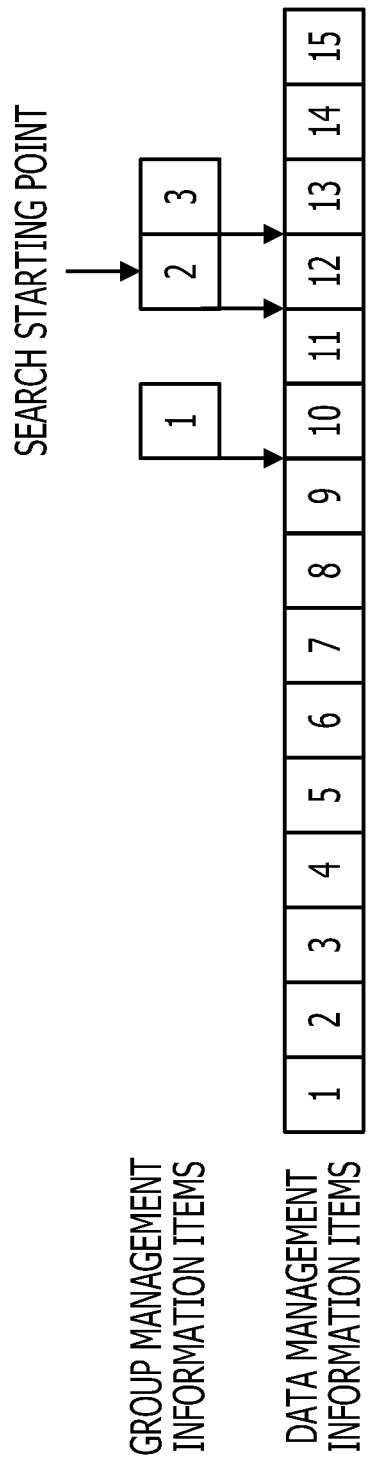
FIG. 24 is a diagram illustrating an arrangement of group management information items, while the arrangement is updated by a method of the first embodiment.

When the method of the present embodiment is used, the arrangement of the group management information items was updated so that the group management information items were arranged as illustrated in FIG. 24. The number of "the group management information items" was set to be equal to the number of the group management information items illustrated in FIG. 23.

As is apparent from Table 3, the average of the accessed positions is 11.7. Thus, the group management information item (with the identification number 2) that is "the point at which the search starts" was arranged and indicated the "data management information item" (with the identification number 12) that is closest to the average of the accessed positions. Dispersions are 1.6. Thus, the group management information item (with the identification number 1) that precedes the central group management information item was arranged and indicated the "data management information item" (with the identification number 10) that corresponds to a position separated by −1.6 (=10.4) from the position of the "data management information item" (with the identification number 12). In addition, the group management information item (with the identification number 3) that succeeds the central group management information item was arranged and indicated the "data management information item" (with the identification number 13) that corresponds to a position separated by +1.6 (=13.6) from the position of the "data management information item" (with the identification number 12).

The number of operations performed in order to access the interval data items indicated by the data management information items included in the arrangement illustrated in FIG. 23 was compared with the number of operations performed in order to access the interval data items indicated by the data management information items included in the arrangement illustrated in FIG. 24. Results of the comparison are indicated in Table 4.

apparent that the number of the operations performed in order to access the interval data items was reduced by the method of the present embodiment.

As described above, the information processing device 10 of the first embodiment updates the arrangement of the group management information items based on a distribution of frequencies of access to the interval data items indicated by the data management information items and can thereby efficiently access an arbitrary interval data item of the data file stored in the HDD 18.

The information processing device 10 arranges the group management information item that is the point at which the search starts so that the group management information item that is the point at which the search starts indicates the data management information item that corresponds to the average of the accessed positions, and whereby the information processing device 10 can efficiently access an interval data item that is frequently accessed.

The information processing device 10 updates the arrangement of the group management information items at predetermined time intervals and thereby efficiently access an interval data item even when the distribution of the frequencies of access to the interval data items contained in the data file changes over time.

Next, a second embodiment is described. Parts that are described in the second embodiment and the same as the parts described in the first embodiment are indicated by the same reference numerals as in the first embodiment, and a description of the configurations of the parts is omitted.

In the second embodiment, a device that stores the data management information items and the group management information items is different from a device that stores the

TABLE 4

| | Accessed positions | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Number of operations (performed using the method) | — | — | — | — | — | — | — | 6 | 5 | 4 | 3 | 4 | 5 | 6 | 7 |
| Number of operations (performed without the method) | — | — | — | — | — | — | — | 5 | 4 | 3 | 4 | 2 | 3 | 4 | 5 |
| Reduced number of operations | — | — | — | — | — | — | — | 1 | 1 | 1 | −1 | 2 | 2 | 2 | 2 |

The total number of the operations performed for the arrangement (illustrated in FIG. 23) without the method of the present embodiment, and the total number of the operations performed for the arrangement (illustrated in FIG. 24) using the method of the present embodiment, were calculated in accordance with the following equation.

(The total number of operations)=Σ(the frequency of access to a position "i")×(the number of operations performed on the accessed position "i")

The total number of the operations performed for the arrangement (illustrated in FIG. 23) without the method of the present embodiment was 202. The total number of the operations performed for the arrangement (illustrated in FIG. 24) using the method of the present embodiment was 147. It is interval data items indicated by the data management information items. This feature is different from the first embodiment.

Figure 25:
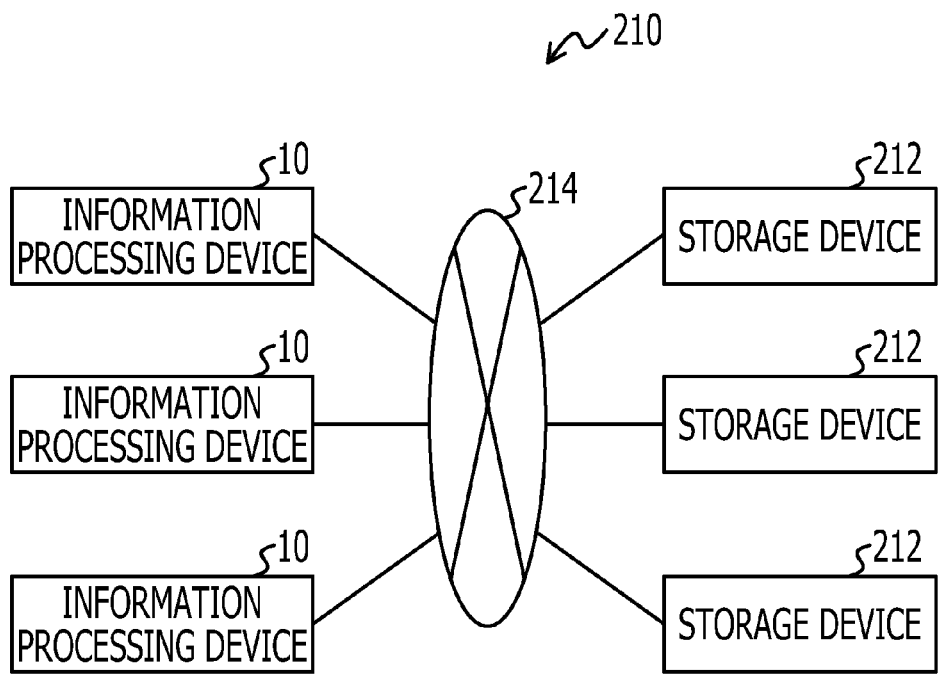
FIG. 25 is a schematic diagram illustrating an information processing system of a second embodiment.

As illustrated in FIG. 25, an information processing system 210 includes a plurality of information processing devices 10 and a plurality of storage devices 212. The plurality of information processing devices 10 and the plurality of storage devices 212 are coupled to each other through a network (for example, a local area network (LAN)) 214.

The storage devices 212 can communicate with the information processing devices 10 through the network 214. The storage devices 212 each store a plurality of interval data items as a data file, like the HDD 18 described in the first embodiment.

The management data storage units 32 of the information processing devices 10 each store group management information items and data management information items that indicate the interval data items stored in each of the storage devices 212.

When information of the position of a part of any of the data files stored in the storage devices 212 is input to any of the information processing devices 10 as an access request, the access processing unit 38 of the interested information processing device 10 accesses the interested storage device 212 through the network 214.

Other configurations and effects of the information processing devices 10 of the second embodiment are the same as the first embodiment, and a description thereof is omitted.

As described above, the information processing devices 10 of the second embodiment each update the arrangement of the group management elements based on a distribution of frequencies of access to the interval data items indicated by the data management information items and can thereby efficiently access an arbitrary interval data item of any of the data files stored in the storage devices 212.

Figure 26:
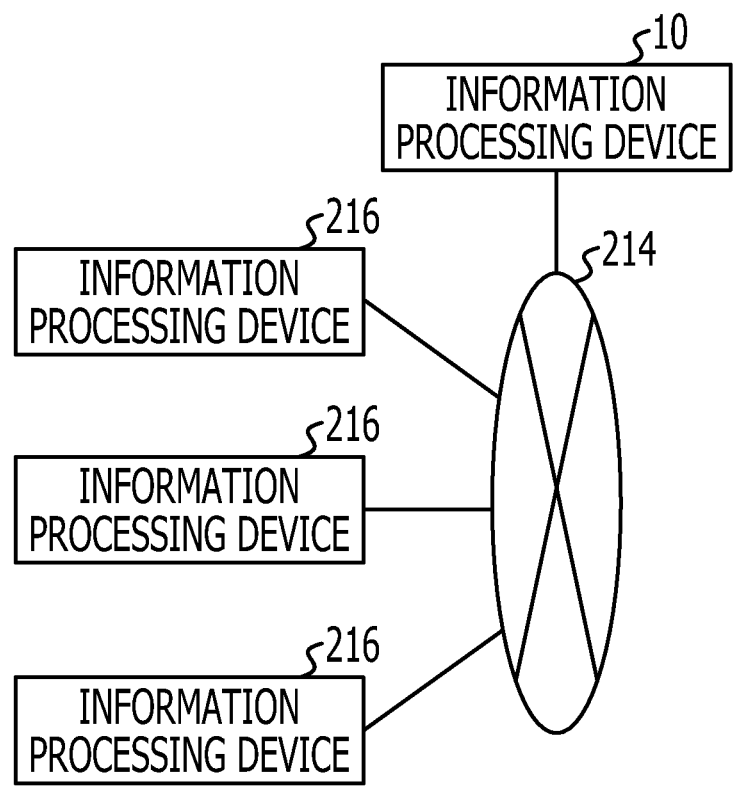
FIG. 26 is a schematic diagram illustrating an information processing system.

As illustrated in FIG. 26, the information processing device 10 that stores the data management information items and the group management information items may be coupled to other information processing devices 216 through the network 214. The other information processing devices 216 each store a plurality of interval data items as a data file. When information of the position of a part of any of the data files stored in the other information processing devices 216 is input to the information processing device 10 as an access request, the access processing unit 38 of the information processing device 10 accesses the other information processing device 216 through the network 214.

Figure 27:
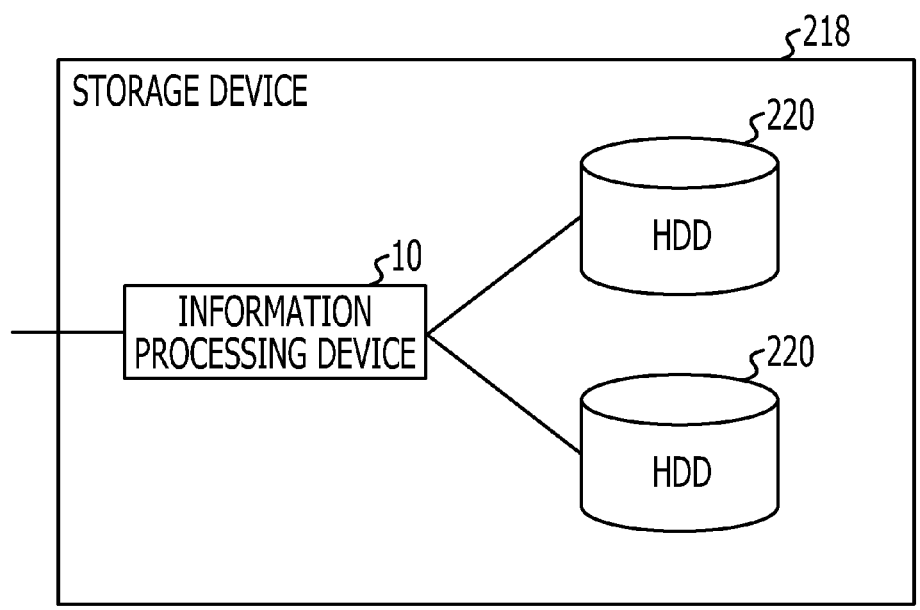
FIG. 27 is a schematic diagram illustrating a storage device.

As illustrated in FIG. 27, a storage device 218 may include the information processing device 10 and a plurality of HDDs 220 that each store a data file. The information processing device 10 is coupled to the HDDs 220. The storage device 218 can communicate with another device (not illustrated) through a network. When information of the position of a part of any of the data files stored in the HDDs 220 is input to the information processing device 10 as an access request, the access processing unit 38 of the information processing device 10 accesses the interested HDD 220.

The first embodiment describes the example in which the information processing device 10 arranges the plurality of group management information items at equal intervals, while the second embodiment describes the example in which the information processing devices 10 each arrange the plurality of group management information items at equal intervals. However, the information processing devices 10 are not limited to the examples. The information processing device 10 may arrange the plurality of group management information items at intervals that are not equal. For example, the information processing device 10 may arrange a group management information item so that the arranged group management information item is separated from a group management information item located adjacent to the arranged group management information item by a value obtained by correcting a standard deviation of access frequencies based on a frequency of access to a corresponding data management information item. Thus, the information processing device 10 can arrange the plurality of group management information items so that the farther the group management information items from the group management information item that is the point at which the search starts, the larger the distances between the group management information items.

The information processing device 10 may arrange the plurality of group management information items at equal intervals and set the plurality of group management information items so that a part of the plurality of group management information items is not used.

The example in which the information processing device 10 arranges a group management information item at a position that is separated by the standard deviation of the access frequencies from the group management information items located adjacent to the arranged group management information items is described above. However, the arrangement of the group management information items is not limited to this. For example, the information processing device 10 may arrange the group management information item at a position that is separated by a value obtained by multiplying the standard deviation of the access frequencies by a certain value from the group management information items located adjacent to the arranged group management information item. In addition, the information processing device 10 may arrange the group management information item at a position that is separated by a value obtained by dividing the standard deviation of the access frequencies by a certain value from the group management information items located adjacent to the arranged group management information item.

The example in which the information processing device 10 searches a group management information item that is closest to the offset position that is indicated by the received information and indicates the position from the beginning of the data file in order to access the data file is described above. The search is not limited to this. For example, the information processing device 10 may search a group management information item of a data management information group to which a data management information item that corresponds to the offset position indicating the position from the beginning of the data file belongs.

The number of group management information items is not limited. The number of group management information items is arbitrary as long as the number of the group management information items is smaller than the number of data management information items.

In the aforementioned examples, it is assumed that a single Gaussian distribution exists in the distribution of the frequencies of the data access. However, the data access is not limited to this. For example, a plurality of Gaussian distributions may exist in the distribution of the frequencies of the data access. In this case, the information processing device 10 calculates the average and standard deviation of accessed positions for each of the Gaussian distributions and updates the arrangement of the group management information items for each of the Gaussian distributions.

The example in which the information processing device 10 calculates the average of the accessed positions as a position that is most frequently accessed is described above. The information processing device 10 is not limited to this. For example, the information processing device 10 may specify, based on frequencies of access to the data management information items, a data management information item that indicates an interval data item that is most frequently accessed.

Figure 28:
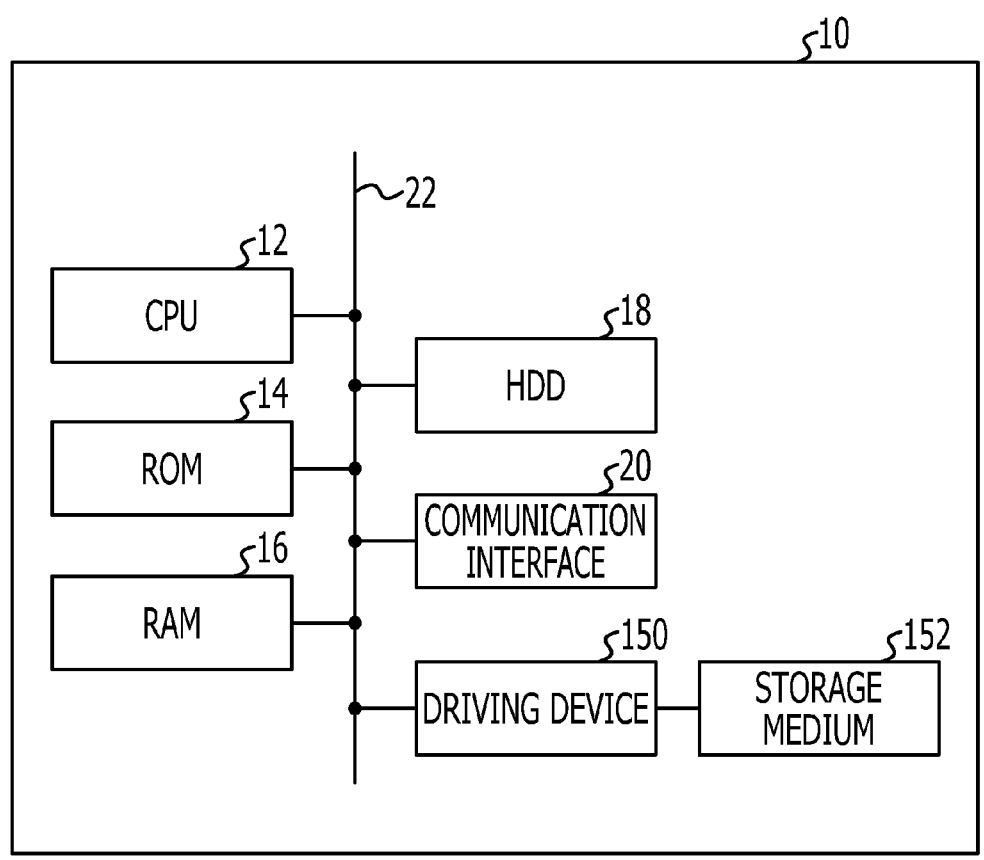
FIG. 28 is a diagram illustrating a state in which programs that are stored in a storage medium is installed in an HDD.

The example in which the program to be executed in order to perform the access processing routine and the program to be executed in order to perform the arrangement update processing routine are stored in the HDD 18 is described above. The storage of the programs is not limited to this. The programs may be stored in a portable storage medium such as a CD-ROM, a DVD-ROM or a universal serial bus (UBS) memory. For example, as illustrated in FIG. 28, a storage medium 152 that is a CD-ROM, a DVD-ROM, a universal serial bus (UBS) memory or the like and stores the program to be executed in order to perform the access processing routine and the program to be executed in order to perform the arrangement update processing routine is set in a driving device 150 that is included in the information processing device 10. The program to be executed in order to perform the access processing routine and the program to be executed in order to perform the arrangement update processing routine are installed from the storage medium 152 into the HDD 18 through the driving device 150.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory medium recording an information processing program causing a computer to execute a process, the process comprising:
    storing a plurality of first management information and a plurality of second management information in a memory, the first management information including a size of each of a plurality of interval data included in a data file stored in a storage that is different from the memory and a position that indicates an order of each of the plurality of interval data, the plurality of second management information including a first identifier that indicates a point at which a search for one of the plurality of interval data starts and associated with the first management information;
    receiving, information of a position in the data file;
    searching the memory to extract one of the plurality of first management information corresponding to the position;
    accessing to the storage to search one of the plurality of interval data corresponding to the one of the plurality of first management information;
    calculating, a distribution of accessing frequency for each of the plurality of first management information, based on the accessing frequency;
    updating the first identifier to generate an updated first identifier based on the distribution of the accessing frequency; and
    accessing to the storage by using the updated first identifier as the point at which the search starts.

2. The non-transitory medium according to claim 1,
    wherein the second management information further includes a second identifier that precedes the first identifier and a third identifier that succeeds the first identifier, and
    wherein the process further comprises setting the second identifier and the third identifier so that the second identifier and the third identifier correspond to positions separated by an interval corresponding to a standard deviation of the distribution of the accessing frequency from the point at which the search starts.

3. The non-transitory medium according to claim 2,
    wherein the calculating, the updating and the setting are processed repeatedly at a predetermined time interval.

4. The non-transitory medium according to claim 3,
    wherein the predetermined time interval is a time period in which a total number of the accessing frequency reaches a predetermined value or a predetermined time period elapses.

5. An information processing device comprising:
    a memory that stores a plurality of first management information and a plurality of second management information, the first management information including a size of each of a plurality of interval data items included in a data file stored in a storage that is different from the memory and a position that indicates an order of each of the plurality of interval data items, the plurality of second management information including a first identifier that indicates a point at which a search for one of the plurality of interval data items starts and associated with the first management information;
    a processor coupled to the memory and configured to:
    receive information of a position in the data file;
    search the memory to extract one of the plurality of first management information corresponding to the position;
    access the storage to search one of the plurality of interval data items corresponding to the one of the plurality of first management information;
    calculate a distribution of accessing frequency for each of the plurality of first management information, based on the accessing frequency;
    update the first identifier to generate an updated first identifier based on the distribution of the accessing frequency; and
    access the storage by using the updated first identifier as the point at which the search starts.

6. The non-transitory medium according to claim 1, wherein the calculating includes calculating an average value of a position which is accessed based on the accessing frequency for each of the plurality of first management information, and wherein the updating includes updating the first identifier so that the first identifier becomes the closest to the average value.

7. The non-transitory medium according to claim 1, wherein the calculating includes extracting a position which is most frequently accessed based on the accessing frequency for each of the plurality of first management information, and wherein the updating includes updating the first identifier so that the first identifier becomes the closest to a value of the position which is most frequently accessed.

8. The non-transitory medium according to claim 1, wherein the updating includes, when a plurality of Gaussian distributions exist, setting the first identifier for each of the plurality of Gaussian distributions.

9. The non-transitory medium according to claim 1, wherein the accessing to the storage by using the updated first identifier includes accessing based on a range between the second identifier and the third identifier.

10. An information processing method executed by a processor included in an information processing device, the information processing method comprising:
    storing a plurality of first management information and a plurality of second management information in a memory, the first management information indicating data sizes of intervals contained in a data file and stored in the storage in order of the intervals and indicating the positions of the intervals on the storage including a size of each of a plurality of interval data items included in a data file stored in a storage that is different from the memory and a position that indicates an order of each of the plurality of interval data items, the plurality of second management information including a first identifier that indicates a point at which a search for one of the plurality of interval data items starts and associated with the first management information;
receiving information of a position in the data file;
searching the memory to extract one of the plurality of first management information corresponding to the position;
accessing to the storage to search one of the plurality of data items corresponding to the one of the plurality of first management information;
calculating a distribution of the accessing frequency for each of the plurality of first management information, based on the accessing frequency;
updating the first identifier to generate an updated first identifier based on the distribution of the accessing frequency; and
accessing to the storage by using the updated first identifier as the point at which the search starts.

\* \* \* \* \*

UNITED STATES PATENT AND TRADEMARK OFFICE
CERTIFICATE OF CORRECTION

| | |
|---|---|
| PATENT NO. | : 8,903,878 B2 |
| APPLICATION NO. | : 13/421352 |
| DATED | : December 2, 2014 |
| INVENTOR(S) | : Masahiro Kihara et al. |

It is certified that error appears in the above-identified patent and that said Letters Patent is hereby corrected as shown below:

In the Claims

Column 21, Line 40, In Claim 1, delete "receiving," and insert -- receiving --, therefor.

Column 21, Line 46, In Claim 1, delete "calculating," and insert -- calculating --, therefor.

Signed and Sealed this
Fifth Day of May, 2015

Michelle K. Lee
*Director of the United States Patent and Trademark Office*